United States Patent [19]

Etter

[11] Patent Number: 5,673,210

[45] Date of Patent: Sep. 30, 1997

[54] SIGNAL RESTORATION USING LEFT-SIDED AND RIGHT-SIDED AUTOREGRESSIVE PARAMETERS

[75] Inventor: Walter Etter, Highlands, N.J.

[73] Assignee: Lucent Technologies Inc., Murray Hill, N.J.

[21] Appl. No.: 536,548

[22] Filed: Sep. 29, 1995

[51] Int. Cl.$^6$ ................................................ G06F 15/31
[52] U.S. Cl. ................. 364/577; 364/723; 364/728.074; 364/737
[58] Field of Search ............................ 364/724.01, 723, 364/728.03, 728.07, 737, 577; 395/2–3

[56] References Cited

U.S. PATENT DOCUMENTS

| | | | |
|---|---|---|---|
| 4,719,649 | 1/1988 | Woddsum et al. | 455/1 |
| 4,751,655 | 6/1988 | Peacock | 364/487 |
| 5,008,940 | 4/1991 | Blum | 395/2.33 |
| 5,224,061 | 6/1993 | Veldhuis | 364/724.01 |

OTHER PUBLICATIONS

"Adaptive Interpolation of Discrete–Time Signals That Can Be Modeled as Autoregressive Processes", by A.J.E.M. Janssen, et al., IEEE Transactions on Acoustics, Speech and Signal Processing, vol. ASSP–34, No. 2, Apr. 1986.

"Waveform Substitution Techniques for Recovering Missing Speech Segments In Packet Voice Communications", by David J. Goodman, et al., IEEE Transactions on Acoustics, Speech, and Signal Processing, vol. ASSP–34, No. 6, Dec. 1986.

"A Method for the Restoration of Burst Errors in Speech Signals", by R. N. J. Veldhuis, Signal Processing III: Theories and Applications, I.T. Young et al. (editors) Elsevier Science Publishers B. V. (North–Holland).

*Primary Examiner*—James P. Trammell
*Assistant Examiner*—Craig Steven Miller
*Attorney, Agent, or Firm*—Steven R. Bartholomew

[57] ABSTRACT

Signal reconstruction methods reconstruct a missing portion of a signal from a first known portion of the signal preceding the missing portion, and a second known portion of the signal succeeding the missing portion. The first known portion of the signal is represented using a first autoregressive model and the second known portion of the signal is represented using a second autoregressive model. These methods construct a signal estimate from the first and second autoregressive models, thereby permitting the reconstruction of any signal having a missing portion, irrespective of whether or not the length of the missing portion is greater than the short-term stationarity duration of the signal.

23 Claims, 8 Drawing Sheets

FIG. 6A  ORIGINAL SIGNAL

FIG. 6B  CORRUPTED SIGNAL

FIG. 6C  LEAST SQUARES RESIDUAL PREDICTOR; SNR=7.9dB

FIG. 6D  ITERATIVE LEAST SQUARE RES. PRED.; k=1; SNR=9.4dB

FIG. 6E  ITERATIVE LEAST SQUARE RES. PRED.; k=3 (CONVERGED); SNR=9.7dB
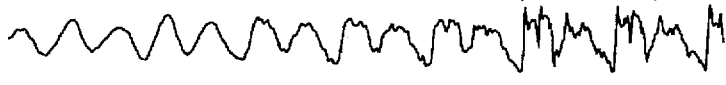

FIG. 6F  WEIGHTED FORWARD-BACKWARD PREDICTOR; SNR=4.8dB

FIG. 6G  ITERATIVE FORWARD PREDICTOR; k=5 (CONVERGED); SNR=3.6dB
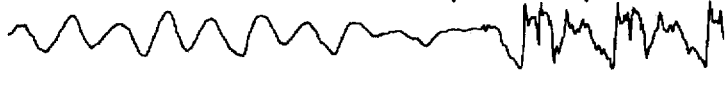

FIG. 6H  PERIODICITY OPTIMIZED PREDICTOR; SNR=3.5dB

FIG. 6I  ITERATIVE PSEUDO INVERSE PREDICTOR; k=3(CONVERGED); SNR=8.7dB

FIG. 6K  WEIGHTED REPETITIVE SUBSTITUTION PREDICTOR; SNR=6.2dB

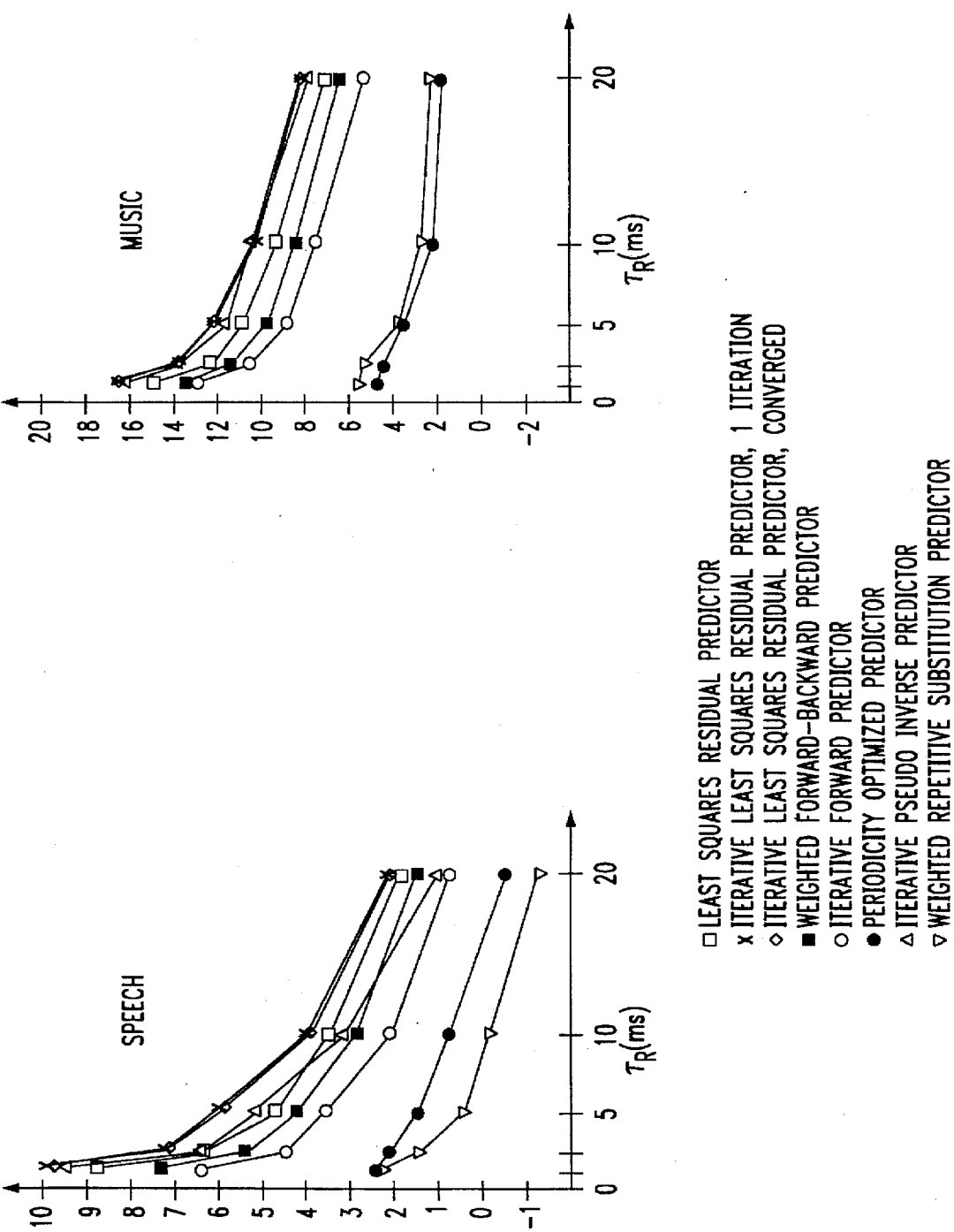

FIG. 7B MUSIC

FIG. 7A SPEECH

□ LEAST SQUARES RESIDUAL PREDICTOR
× ITERATIVE LEAST SQUARES RESIDUAL PREDICTOR, 1 ITERATION
◇ ITERATIVE LEAST SQUARES RESIDUAL PREDICTOR, CONVERGED
■ WEIGHTED FORWARD-BACKWARD PREDICTOR
○ ITERATIVE FORWARD PREDICTOR
● PERIODICITY OPTIMIZED PREDICTOR
△ ITERATIVE PSEUDO INVERSE PREDICTOR
▽ WEIGHTED REPETITIVE SUBSTITUTION PREDICTOR

FIG. 8

| SPEECH | RESTORATION LENGTH $T_R$ | | | | |
|---|---|---|---|---|---|
| | 1.25ms | 2.5ms | 5ms | 10ms | 20ms |
| LSR PREDICTOR | 8.74 | 6.33 | 4.80 | 3.57 | 1.96 |
| ITER. LSR PRED., 1 ITER. | 9.89 | 7.24 | 5.99 | 4.12 | 2.30 |
| ITER. LSR PRED., CONVERGED | 9.77 | 7.16 | 5.90 | 4.04 | 2.16 |
| MUSIC | RESTORATION LENGTH $T_R$ | | | | |
| | 1.25ms | 2.5ms | 5ms | 10ms | 20ms |
| LSR PREDICTOR | 15.08 | 12.51 | 11.05 | 9.54 | 7.36 |
| ITER. LSR PRED., 1 ITER. | 16.54 | 13.85 | 12.29 | 10.39 | 8.22 |
| ITER. LSR PRED., CONVERGED | 16.59 | 13.88 | 12.34 | 10.43 | 8.25 |

AVERAGE SIGNAL-TO-NOISE RATIO IN dB FOR LEAST SQUARES RESIDUAL (LSR) PREDICTOR, ITERATIVE LSR PREDICTOR FOR 1 ITERATION AND ITERATIVE LSR PREDICTOR CONVERGED. FOR THE ITERATIVE LSR PREDICTORS, ONLY ONE SINGLE AR MODEL IS USED FOR ITERATION NUMBER $k \geq 1$. THE AVERAGE IS CALCULATED OVER 200 RESTORED SEGMENTS.

SIGNAL RESTORATION USING LEFT-SIDED AND RIGHT-SIDED AUTOREGRESSIVE PARAMETERS

BACKGROUND OF THE INVENTION

1. Field of the Invention

The invention relates generally to signal processing techniques, and more specifically to the restoration of a missing or corrupted segment of a signal.

2. Description of the Related Art

Interpolation techniques have been employed in applications such as sampling rate converters, data rate reduction of speech signals, and reconstruction of missing packets in speech transmission. Other applications of interpolation include reconstructing lost samples of information recorded on compact discs, compensating for digital audio tape dropouts, and restoring old 78-rpm recordings.

Interpolation and extrapolation are complementary techniques. Interpolation addresses the problem of estimating one or more missing samples, wherein the samples immediately succeeding the missing samples, as well as the samples immediately preceding the missing samples, are known. Extrapolation, by contrast, refers to the problem of finding an estimate of samples outside a given interval of known samples. For example, extrapolation techniques may be utilized to obtain increased spectral resolution. Several signal restoration techniques are capable of implementing interpolation as well as extrapolation.

Autoregressive parameters may be employed in conjunction with interpolation and/or extrapolation. Autoregressive parameters are defined as including any set of mathematical variables and/or constants employed for the purpose of modeling a time-dependent function. This time-dependent function may include, for example, a digitized waveform. The time-dependent function is modeled such that, if an excitation is applied to the input of the model, the output of the model will provide a reconstructed version of the original time-dependent function. For purposes of determining the error of the reconstructed signal, the original time-dependent function is taken as the reference, and the output of the model is compared to this reference. Conventional error measurement techniques, such as the least-squared error, may be employed. Note that, if the time-dependent function is applied to an inverse of this model, the inverse model will remove all information pertaining to this function.

Autoregressive parameters contain information for computing various characteristics of the original time-dependent function, including, for example, the frequency spectrum of this function. These autoregressive parameters may also be conceptualized as linear prediction coefficients because a conventional finite impulse response (FIR) filter programmed to implement these coefficients will predict the next value of a time-dependent function based upon a number of known past values for this function.

Existing interpolation techniques have addressed the problem of estimating one or more missing samples. For example, A. J. E. M. Janssen, R. N. J. Veldhuis, and L. B. Vires describe an interpolation technique in an article entitled, "Adaptive Interpolation of Discrete-Time Signals That Can Be Modeled as Autoregressive Processes", IEEE Transactions on Acoustics, Speech, and Signal Processing, Vol. ASSP-34, No. 2, April 1986, hereinafter referred to as the Janssen reference. The technique described in the Janssen reference results in a 2-step iterative scheme. In the first step, the autoregressive parameters of the signal are estimated based on an initial estimate for the missing samples. In the second step, a new estimate for the missing samples are obtained by applying a standard autoregression model. These steps are iteratively applied until convergence is reached.

The extent to which a signal remains stationary in the neighborhood of the missing portion of the signal is often referred to as stationarity. More specifically, stationarity may be defined as the amount of similarity between the left-sided and right-sided autoregressive parameter vectors. The Janssen technique relies upon an assumption that the signal to be restored exhibits short-term stationarity on either side of the missing segment of the signal.

In contrast to the computationally complex method of Janssen, other existing algorithms are well-suited to real-time applications, and many of these are based upon the somewhat periodic nature of audio waveforms. Stated in another way, the frequency spectrum of audio waveforms, such as speech and music, oftentimes does not change significantly over short periods of time. The most straightforward approach to preserving periodicity is by repeating the samples from the immediately preceding period. Another substitution technique based on pattern matching has been described by D. J. Goodman, G. B. Lockhart, O. J. Waem, and W. C. Wong, in an article entitled, "Waveform Substitution Techniques for Recovering Missing Speech Segments in Packet Voice Communications", IEEE Transactions on Acoustics, Speech, and Signal Processing, Vol. ASSP-34, No. 6, December 1986, and referred to hereinafter as Goodman. Goodman utilizes a waveform pattern that is repeated, such that the waveform matches the very last data prior to the missing segment.

R. N. J. Veldhuis derived an algorithm which is described in an article entitled, "A Method for the Restoration of Burst Errors in Speech Signals", Signal Processing 3: Theories and Applications, North-Holland, pp. 403–406, 1986, hereinafter Veldhuis. Veldhuis uses pitch information from the speech signal and restores the signal so that maximum periodicity is obtained. In the context of interpolation, speech has been modeled not only as an autoregressive process, or as a periodic process, but also modeled by a combination of sinusoids (i.e., Fourier transform followed by low-pass filtering). Other existing methods have reduced extrapolation and interpolation to a process involving the inversion of a non-quadratic matrix, leading to a mathematical operation known as the pseudo inverse transformation.

What is needed is an improved interpolation technique that reduces the interpolation error relative to various prior art techniques. Iterative methods usually reach a lower interpolation error than non-iterative methods. However, prior art iterative methods, such as the Janssen method, are all based upon the assumption that the signal is stationary in the vicinity of the missing portion. An improved iterative interpolation technique should not impose this stationarity assumption. Such an iterative method should converge after a relatively few number of iterations in order to provide computational expediency. Additionally, such an iterative method should not start with an initial estimate that sets all missing samples to zero and then applies a single autoregressive model to reconstruct the signal.

SUMMARY OF THE INVENTION

Improved signal reconstruction methods reconstruct a missing portion of a signal from a first known portion of the signal preceding the missing portion, and a second known portion of the signal succeeding the missing portion. The first known portion of the signal includes a first set of known samples, the second known portion of the signal includes a second set of known samples, and the missing portion of the signal is reconstructed by predicting values for a set of missing samples. The first set of known samples is represented using a first autoregressive model and the second set of known samples is represented using a second autoregressive model. Autoregressive models employ a set of mathematical parameters that model one or more signal characteristics. These parameters may be generated from a set of known signal samples using existing mathematical techniques, such as the Levinson-Durbin algorithm.

The signal reconstruction methods disclosed herein utilize an iterative signal reconstruction process that commences with an initial estimate of the missing portion based upon a first autoregressive model, termed the left-sided autoregressive model, and a second autoregressive model, termed the right-sided autoregressive model. Subsequent iterations may, but need not, be performed to provide a reconstructed signal having a smaller mean-squared error with reference to the missing portion of the signal. The first and second autoregressive models predict values for the missing samples in a forward-looking direction, starting from earlier-occurring known samples and progressing to later-occurring known samples, and/or in a backward-looking direction, starting from later-occurring known samples and progressing to earlier-occurring known samples. Each of respective samples in the first set of known samples is multiplied by a corresponding autoregressive parameter selected from the first autoregressive model to generate a first set of multiplicative products. Each of respective samples in the second set of known samples is multiplied by a corresponding autoregressive parameter selected from the second autoregressive model to generate a second set of multiplicative products. Each of a plurality of respective multiplicative products in the first set of multiplicative products are summed up with corresponding multiplicative products in the second set of multiplicative products to obtain values for each samples in the set of missing samples. Sample values for the missing portion of the signal can be accurately reconstructed even if the signal exhibits substantial changes in the vicinity of the missing portion.

According to a first embodiment disclosed herein, an initial interpolated signal estimate vector, $\hat{x}^{(0)}$, is constructed for a missing portion of the signal by applying the following steps:

1) a) Representing the first set of known samples in the form of a left-sided sample vector $\vec{l}$. Each numerical value of vector $\vec{l}$ represents a corresponding sample value from the first set of known samples. b) Projecting vector $\vec{l}$ into a two-dimensional array to form a matrix denoted as L, such that each entry of matrix L includes a sample value from the first set of known samples. c) Representing the second set of known samples in the form of a right-sided sample vector $\vec{r}$. Each numerical value of vector $\vec{r}$ represents a corresponding sample value from the second set of known samples. d) Projecting vector $\vec{r}$ into a two-dimensional array to form a matrix denoted as R, such that each entry of matrix R includes a sample value from the second set of known samples.

2) Generating a left-sided autoregressive parameter vector $\vec{\alpha}$ from left-sided sample vector $\vec{l}$, and generating a right-sided autoregressive parameter vector $\vec{b}$ from right-sided sample vector $\vec{r}$, using an existing autoregressive modeling algorithm such as the Levinson-Durbin algorithm.

3) a) Predicting values for the missing set of samples in a forward-looking direction by applying the left-sided autoregressive parameter vector $\vec{\alpha}$ to the first set of known samples, wherein this prediction is expressed mathematically as $L\vec{\alpha}$. b) Predicting values for the missing set of samples in a backward-looking direction by applying the right-sided autoregressive parameter vector $\vec{b}$ to the second set of known samples, wherein this prediction is expressed mathematically as $R\vec{b}$.

4) a) Predicting values for the missing set of samples in a backward-looking direction by applying the left-sided autoregressive parameter vector $\vec{\alpha}$ to the missing sample values predicted in step 3)a), wherein this prediction is denoted mathematically as $A^T.L\vec{\alpha}$. b) Predicting values for the missing samples in a forward-looking direction by applying the right-sided autoregressive parameter vector $\vec{b}$ to the missing sample values predicted in step 3)b), wherein this prediction is denoted mathematically as $B^T.R\vec{b}$. c) Summing up corresponding values predicted in step 4)a) with corresponding values predicted in step 4)b), and inverting the summed values to construct a right-hand side vector $\vec{y}$ of a linear equation system, mathematically denoted as $\vec{y} = -A^T.L\vec{\alpha} - B^T.R\vec{b}$.

5) Placing the left-sided and right-sided autoregressive parameter vectors $\vec{\alpha}$ and $\vec{b}$ into matrix format, the elements of $\vec{\alpha}$ forming a matrix denoted as A, and the elements of $\vec{b}$ forming a matrix denoted as B, each entry of matrix A representing a left-sided autoregressive parameter and each entry of matrix B representing a right-sided autoregressive parameter.

6) Constructing a system matrix D by performing matrix operations on A and B as follows: $D = A^T A + B^T B$. Each of the entries in system matrix D representing a specific combination of left-sided and right-sided autoregressive parameters.

7) Solving a linear equation system, denoted as $D.\hat{x} = \vec{y}$, by inverting the matrix D and multiplying the inverted matrix with the right-hand side vector $\vec{y}$ to obtain an initial interpolated signal estimate vector for the missing portion of the signal, denoted as $\hat{x}^{(0)}$.

According to a further embodiment disclosed herein, the left-sided sample vector $\vec{l}$ is augmented by incorporating $\vec{l}$, along with an additional H samples of the previous estimate for the missing portion of the signal, $\hat{x}^{(0)}$, into a first augmented left-sided sample vector $\vec{l}^{(1)}$. At about the same time, right-sided sample vector $\vec{r}$ is augmented by incorporating $\vec{r}$, along with an additional H samples of the previous estimate for the missing portion of the signal $\hat{x}^{(0)}$, into a first augmented right-sided sample vector $\vec{r}^{(1)}$. These augmented sample vectors are used to calculate a first iterative estimate vector, $\overset{\Delta}{\overset{\rightarrow}{x}}{}^{(1)}$, for the missing portion of the signal by repeating steps 2) to 7) above. In a first alternate embodiment disclosed herein, the first iterative estimate vector, $\overset{\Delta}{\overset{\rightarrow}{x}}{}^{(1)}$, represents the final reconstructed version of the missing portion of the signal. However, in a second alternate embodiment, the first iterative estimate vector, $\overset{\Delta}{\overset{\rightarrow}{x}}{}^{(1)}$, represents an estimate to be further refined by subsequent iterations.

According to the second alternate embodiment, after the first iteration (k=1) is performed, the left-sided sample vector $\vec{l}$ is augmented by incorporating $\vec{l}$, along with 2H additional samples from $\overset{\Delta}{\overset{\rightarrow}{x}}{}^{(1)}$, into a second augmented left-sided sample vector $\vec{l}^{(2)}$. At about the same time, the right-sided sample vector $\vec{r}$ is augmented by incorporating $\vec{r}$, along with 2H additional samples from $\overset{\Delta}{\overset{\rightarrow}{x}}{}^{(1)}$, into a second augmented right-sided sample vector $\vec{r}^{(2)}$. Steps 2) to 7) set forth above are repeated to obtain a new signal estimate vector $\overset{\Delta}{\overset{\rightarrow}{x}}{}^{(2)}$. After the (k−1)$^{th}$ iteration is performed, the left-sided sample vector $\vec{l}$ is augmented by incorporating $\vec{l}$, along with k.H additional samples from $\overset{\Delta}{\overset{\rightarrow}{x}}{}^{(k-1)}$, into a $k^{th}$ augmented left-sided sample vector $\vec{l}^{(k)}$. Similarly, after the (k−1)$^{th}$ iteration, the right-sided sample vector $\vec{r}$ is augmented by incorporating $\vec{r}$, along with k.H additional samples, into a $k^{th}$ augmented right-sided sample vector $\vec{r}^{(k)}$. Steps 2) to 7) are repeated to obtain a new signal estimate vector $\overset{\Delta}{\overset{\rightarrow}{x}}{}^{(k)}$. This iterative process ceases after the mean-squared difference between two successive signal estimate vectors constructed from two consecutive iterations is smaller than a predefined value. Alternatively, the iterative process ceases after a specified maximum number of iterations. The signal estimate vector obtained from the last iteration sets forth reconstructed sample values for the missing portion of the signal.

An additional embodiment, setting forth a special case of the second alternate embodiment, is well-suited to a hardware implementation. Only one iterative step is employed which is further characterized by the amount of augmentation: the left-sided and right-sided sample vectors $\vec{l}$ and $\vec{r}$ are completely augmented such that the augmented vectors are equal, i.e., $\vec{l}^{(1)} = \vec{r}^{(1)}$. As a consequence, the autoregressive parameter vectors are also equal, i.e., $\vec{\alpha}^{(1)} = \vec{b}^{(1)}$.

BRIEF DESCRIPTION OF THE DRAWINGS

FIGS. 6A–6I and 6K are waveform diagrams setting forth an original test signal, a corrupted test signal, corrupted test signals restored using various prior art methods, and corrupted test signals restored according to various preferred embodiments disclosed herein;

FIGS. 7A and 7B are graphs showing average signal-to-noise ratio versus the duration of the restored segment for speech and music signals, respectively; and FIG. 8 is a table showing the average signal-to-noise ratios provided by various signal restoration techniques.

DETAILED DESCRIPTION OF THE PREFERRED EMBODIMENTS

Figure 1:
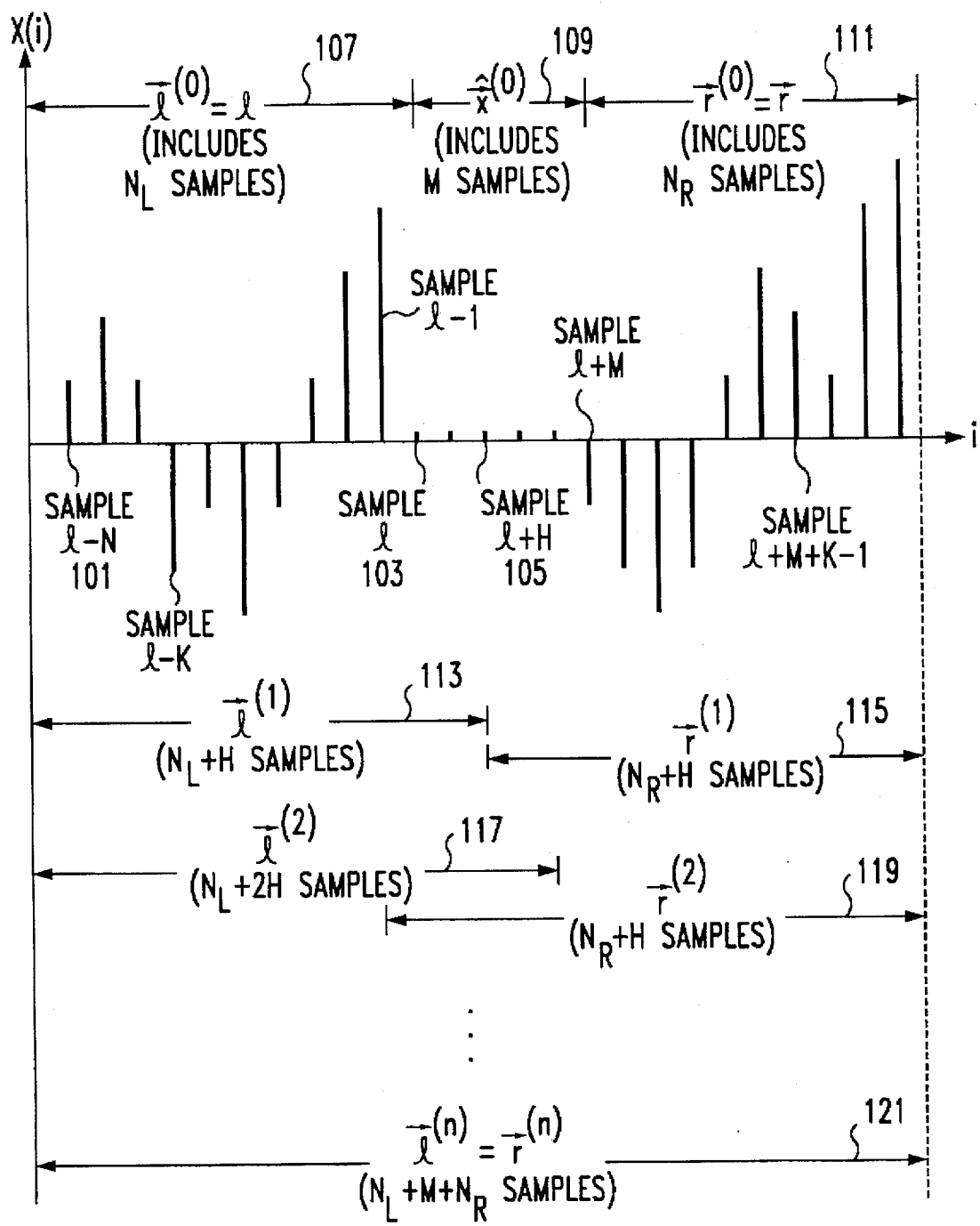
FIG. 1 is a graphical representation of a signal to be restored using any of the various embodiments disclosed herein.

A first embodiment disclosed herein provides a novel iterative signal restoration technique that performs interpolation based upon first and second autoregressive models. The first autoregressive model represents a first known set of samples preceding a missing set of samples, and therefore may be conceptualized as a left-sided autoregressive model. The second autoregressive model represents a second known set of samples succeeding a missing set of samples, and therefore may be conceptualized as a right-sided autoregressive model. A second embodiment is characterized from the first embodiment in that a first interpolation step uses the first and second autoregressive models, whereas a second interpolation step uses a single autoregressive model derived from the first and second autoregressive models.

Autoregressive models are advantageously employed in the context of signal restoration to provide restored signals having smaller interpolation errors than exist using prior art techniques. In general, autoregressive models utilize a plurality of autoregressive parameters. These parameters are defined as including any set of mathematical variables and/or constants employed for the purpose of modeling a time-dependent function. This time-dependent function may include, for example, a digitized signal waveform. The time-dependent function is modeled such that, if white noise is applied to the input of the model, the output of the model will provide a reconstructed version of the original time-dependent function. For purposes of determining this error, the original time-dependent function is taken as the reference, and the output of the model is compared to this reference. Conventional error measurement techniques, such as the least-squared error, may be employed.

Autoregressive parameters contain information for computing various characteristics of the original time-dependent function (i.e., the original signal), including, for example, the frequency spectrum of this function. These autoregressive parameters may also be conceptualized as linear prediction coefficients because a conventional finite impulse response (FIR) filter programmed to implement these coefficients will predict the next value of a time-dependent function based upon a number of known past values for this function.

The previously-described Janssen et al. paper derives an iterative algorithm based upon an autoregressive model that performs signal reconstruction only in a forward-looking direction. Two basic problems arise in conjunction with this approach. First, the technique described in Janssen requires a certain numerical limit, termed a "global minimum", to be achieved, yet no mechanism is provided for achieving this global minimum. Second, the assumption that the signal is relatively stationary near the missing portion (i.e., the signal exhibits) is often not valid, especially when the length of the missing segment is on the order of 10 milliseconds or more.

The shortcomings of the Janssen approach are eliminated in the techniques disclosed herein. These techniques advantageously exploit the fact that it is not necessary to estimate the autoregressive parameters of the missing segment in order to obtain a first estimate for the missing signal. Instead, it is only necessary to determine the autoregressive parameters of a first known portion of the signal immediately preceding the missing segment (i.e., left-sided autoregressive parameters), as well as the autoregressive parameters of a second known portion of the signal immediately succeeding the missing segment (i.e., right-sided autoregressive parameters). In this manner, a direct estimate of the missing segment is obtained from the left-sided and right-sided autoregressive parameters, and this estimate is more accurate than estimates provided by various prior art techniques. Moreover, this direct estimate may be further improved by utilizing iterative procedures, wherein the direct estimate is taken as an initial estimate.

The embodiments disclosed herein operate to restore a degraded signal, an example of which is shown in FIG. 1. Consider a signal x(i), where a portion of x(i) is missing or corrupted. This missing or corrupted portion, referred to as a missing segment 109, includes M samples. Missing segment 109 is represented mathematically using a missing signal vector $$\vec{x} = [x(l)\,x(l+1)\ldots x(l+M-1)]^T$$

wherein the superscript T denotes the mathematical operation of transposition. The methods disclosed herein restore the missing segment 109 based upon a first known portion of signal x(i) that occurs prior to the missing segment, and a second known portion of signal x(i) that occurs subsequent to the missing segment 109. The first known portion may be referred to as the "first-sided" or "left-sided" portion 107 of signal x(i) because it appears to the left of the missing segment 109 on a graph of the signal that shows amplitude on the y-axis as a function of time on the x-axis. The left-sided portion 109, including a total of $N_L$ samples, is characterized mathematically by the expression $$\vec{l} = [x(l-N_L)\,x(l-N_L+1)\ldots x(l-1)]^T$$

In a similar manner, the second known portion of signal x(i) may be referred to as the second-sided or right-sided portion 111 of signal x(i). The right-sided portion 111, including a total of $N_R$ samples, is characterized mathematically by the expression $$\vec{r} = [x(l+M)\,x(l+M+1)\ldots x(l+M+N_R-1)]^T.$$

Signal x(i) is a digitized signal that describes a plurality of signal samples taken at periodic time intervals. In the example of FIG. 1, these samples include sample (l−N) 101, sample (l) 103, and sample (l+H) 105, wherein H is a positive integer.

Prior to interpolating missing segment 109, the number of missing samples M is determined. $N_L$ and $N_R$, representing the number of samples to be incorporated within the left-sided portion 107, and the number of samples to be incorporated within the right-sided portion 111, respectively, are selected. The right-sided portion 111 is represented mathematically by a right-sided sample vector $\vec{r}$ and the left-sided portion 107 is represented by a left-sided sample vector $\vec{l}$. In this manner, signal x(i), representing a corrupted input signal, is segmented into a left-sided sample vector $\vec{l}$ and a right-sided sample vector $\vec{r}$. An initial estimate $\hat{x}^{(0)}$ of missing segment 109 may, but need not, be obtained using a conventional signal restoration technique, such as the weighted forward-backward predictor (Appendix B).

The interpolation of missing segment 109 involves one or more iterative steps. The number of iterations to be performed is denoted by the variable k. For the first iteration, k=1, the left-sided sample vector $\vec{l}$ and the right-sided sample vector $\vec{r}$ are each augmented by incorporating an additional H samples of $\hat{x}^{(0)}$ into each vector. H denotes the number of additional samples to be added to the right-hand side of the left-sided sample vector $\vec{l}$, and H also denotes the number of additional samples to be added to the left-hand side of the right-sided sample vector $\vec{r}$. Accordingly, although the same number (H) of additional samples are added to each of the sample vectors $\vec{l}$ and $\vec{r}$, the specific sample values incorporated into $\vec{l}$ are not necessarily identical to the specific sample values incorporated into $\vec{r}$.

In the example of FIG. 1, an initial interpolated signal estimate vector, $\hat{x}^{(0)}$, is calculated for missing segment 109. Next, the left-sided sample vector $\vec{l}$ is augmented by incorporating $\vec{l}$, along with an additional H samples of $\hat{x}^{(0)}$, into a first augmented left-sided sample vector 113 $\vec{l}^{(1)}$. At the same time, right-sided sample vector $\vec{r}$ is augmented by incorporating $\vec{r}$, along with an additional H samples of $\hat{x}^{(0)}$, into a first augmented right-sided sample vector 115 $\vec{r}^{(1)}$.

As shown in FIG. 1, after the first iteration (k=1) is performed, left-sided sample vector 107 is augmented by incorporating $\vec{l}$, along with 2H additional samples of $\hat{x}^{(1)}$, into a second augmented left-sided sample vector 117, represented as $\vec{l}^{(2)}$. At the same time, the right-sided sample vector 111 is augmented by incorporating $\vec{r}$, along with 2H additional samples of $\hat{x}^{(1)}$, into second augmented right-sided sample vector 119, represented as $\vec{r}^{(2)}$. After the (n−1)$^{th}$ iteration is performed, the left-sided sample vector $\vec{l}$ is augmented by incorporating $\vec{l}$, along with n.H additional samples of $\hat{x}^{(n-1)}$, into a n$^{th}$ augmented left-sided sample vector represented mathematically as $\vec{l}^{(n)}$. Similarly, after the (n−1)$^{th}$ iteration, the right-sided sample vector $\vec{r}$ is augmented by incorporating $\vec{r}$, along with n.H additional samples of $\hat{x}^{(n-1)}$, into a n$^{th}$ augmented right-sided sample vector $\vec{r}^{(n)}$. Note that, in the present example, after n iterations have been performed, $\vec{l}^{(n)}$ and $\vec{r}^{(n)}$ have been augmented to such an extent that $\vec{l}^{(n)}$ and $\vec{r}^{(n)}$ now represent exactly the same vector, shown as $\vec{l}^{(n)} = \vec{r}^{(n)}$ (121) representing the n$^{th}$ left-sided sample vector. In this case, the n$^{th}$ left-sided sample vector may also be referred to as the n$^{th}$ right-sided sample vector.

The augmented left-sided sample vector $\vec{l}^{(k)}$ and the augmented right-sided sample vector $\vec{r}^{(k)}$ at iteration k are obtained from the left-sided sample vector $\vec{l}$, the right-sided sample vector $\vec{r}$, and from the interpolated signal estimate vector $\hat{\vec{x}}^{(k-1)}$ of the previous iteration. These sample vectors are used to determine left-sided and right-sided autoregressive parameter vectors $\vec{\alpha}^{(k)}$ and $\vec{b}^{(k)}$. The autoregressive parameter vectors are placed into matrix format, the elements of vector $\vec{\alpha}^{(k)}$ forming a matrix denoted as $A^{(k)}$, and the elements of vector $\vec{b}^{(k)}$ forming a matrix denoted as $B^{(k)}$. The left-sided sample vector $\vec{l}$ is placed into matrix format to form a matrix denoted as L, and the right-sided sample vector $\vec{r}$ is placed into matrix format to form a matrix denoted as R. A system matrix, denoted as $D^{(k)}$, is calculated by performing matrix operations on $A^{(k)}$ and $B^{(k)}$ as follows:

$$D^{(k)} = A^{(k)T} A^{(k)} + B^{(k)T} B^{(k)}$$

A vector, denoted as $\vec{y}^{(k)}$, is calculated from matrices $A^{(k)}$, $B^{(k)}$, $L^{(k)}$, $R^{(k)}$, and vectors -(k) $\vec{\alpha}^{(k)}$ and $\vec{b}^{(k)}$, using the mathematical relationship $$\vec{y}^{(k)} = A^{(k)T} L \vec{\alpha}^{(k)} - B^{(k)T} R \vec{b}^{(k)}$$

An estimate $\hat{\vec{x}}^{(k)}$ for missing segment 109 is now generated by solving:

$$D^{(k)} \cdot \hat{\vec{x}}^{(k)} = \vec{y}^{(k)}.$$

The immediately preceding iterative algorithm is a novel approach to signal reconstruction. It is an iterative application of the least squares residue prediction method derived in Appendix A.

An example of how the left-sided and right-sided sample vectors can be augmented is given in the following two equations:

$$\vec{l}^{(k)} = [x(l-N_L) x(l-N_L+1) \ldots x(l-1) \hat{x}^{(k-1)}(l) \ldots \hat{x}^{(k-1)}(l-1+p.H)]^T$$

and $$\vec{r}^{(k)} = [\hat{x}^{(k-1)}(l+M-2-p.H) \ldots \hat{x}^{(k-1)}(l+M-1) x(l+M) \ldots x(l+M+N_R-1)]^T.$$

If the value p is set equal to the iteration index k, this way of augmenting the sample vectors is equivalent with the description given along with FIG. 1. The augmentation number H is based upon the number of missing samples, e.g., H=M/3.

Figure 2:
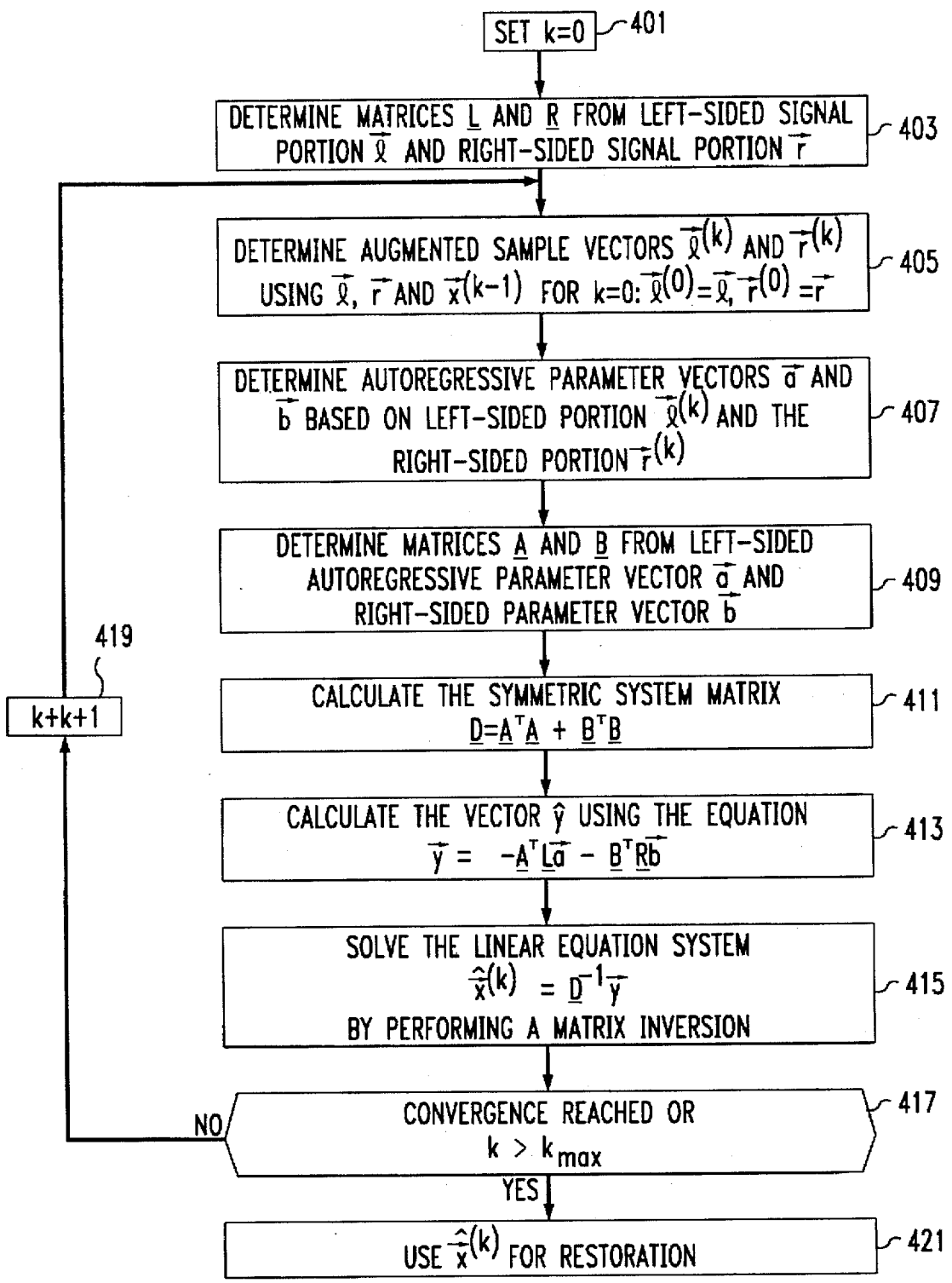
FIG. 2 is a software flowchart describing a first operational sequence for restoring a degraded signal according to an embodiment disclosed herein.

The immediately preceding interpolation method is summarized in FIG. 2, which is a software flowchart describing an operational sequence for restoring a degraded signal according to a first embodiment disclosed herein. Referring now to FIG. 2, the iteration index k is first set to zero (block 401). Next, the matrices L and R are determined from the left-sided and right-sided sample vectors (block 403). The matrix L includes samples from sample l−K up to sample l−1, the matrix R includes samples from sample l+M up to sample l+M+K−1, according to the definition in Appendix A. At block 405, the sample vectors $\vec{l}$ and $\vec{r}$ are augmented using the signal estimate $\hat{\vec{x}}^{(k-1)}$ from the previous iteration. Note that for k=0, the augmented vectors are initialized by $\vec{l}^{(0)} = \vec{l}$ and $\vec{r}^{(0)} = \vec{r}$. The augmented vectors are used at block 407 to determine the autoregressive parameter vectors $\vec{\alpha}$ and $\vec{b}$. To simplify the notation, we have dropped the iteration index for the vectors $\vec{\alpha}$, $\vec{b}$ and $\vec{y}$, as well as for the matrices A, B and D. At block 409, the matrices A and B are built based on the autoregressive parameter vectors $\vec{\alpha}$ and $\vec{b}$ according to Appendix A. The system matrix is then calculated using equation (25) (block 411). At block 413, a vector $\vec{y}$ is calculated using equation (26). The linear equation system (24) is solved at block 415 by inverting the system matrix D. At block 417, a convergence criteria is applied based on the similarity of two successive signal estimates $\hat{\vec{x}}^{(k)}$ and $\hat{\vec{x}}^{(k-1)}$, or/and the iteration number is compared with a maximum of allowable iterations. If the result is "yes", the signal estimate $\hat{\vec{x}}^{(k)}$ is used for the restoration (block 421). Otherwise, the iteration index is incremented by one in block 419 and the iteration is continued. An alternate way of augmenting the sample vectors is obtained when p is set to 1. In this case, the length of the augmented sample vectors is constant for all iterations k>0 and equals $N_L+M$ or $N_R+M$, respectively. If H>M, known samples from the opposite side are also used to determine the autoregressive parameter vector. Consider the case where the number of given samples on the left-hand (first) side equals the number of given samples on the right-hand (second) side, i.e., $N=N_L=N_R$. Furthermore, if H is selected such that H=M+N, then the signal portion (i.e., the number of samples) that is used to estimate the left-sided autoregressive parameter vector is identical to the number of samples used to estimate the right-sided autoregressive parameter vector. In this case, the left-sided and right-sided autoregressive parameter vectors will also be identical. Hence, for the iterations k>0, the signal in the vicinity of the disturbance (i.e., the missing portion of the signal) need only be modeled by a single autoregressive model, with the autoregressive parameter vector $\vec{c}^{(k)} = \vec{\alpha}^{(k)} = \vec{b}^{(k)}$, and the autoregressive parameter $C^{(k)} = A^{(k)} = B^{T(k)}$. This iterative method set forth in greater detail in FIG. 3, is useful in that it improves the initial signal estimate after only one iteration.

Figure 3:
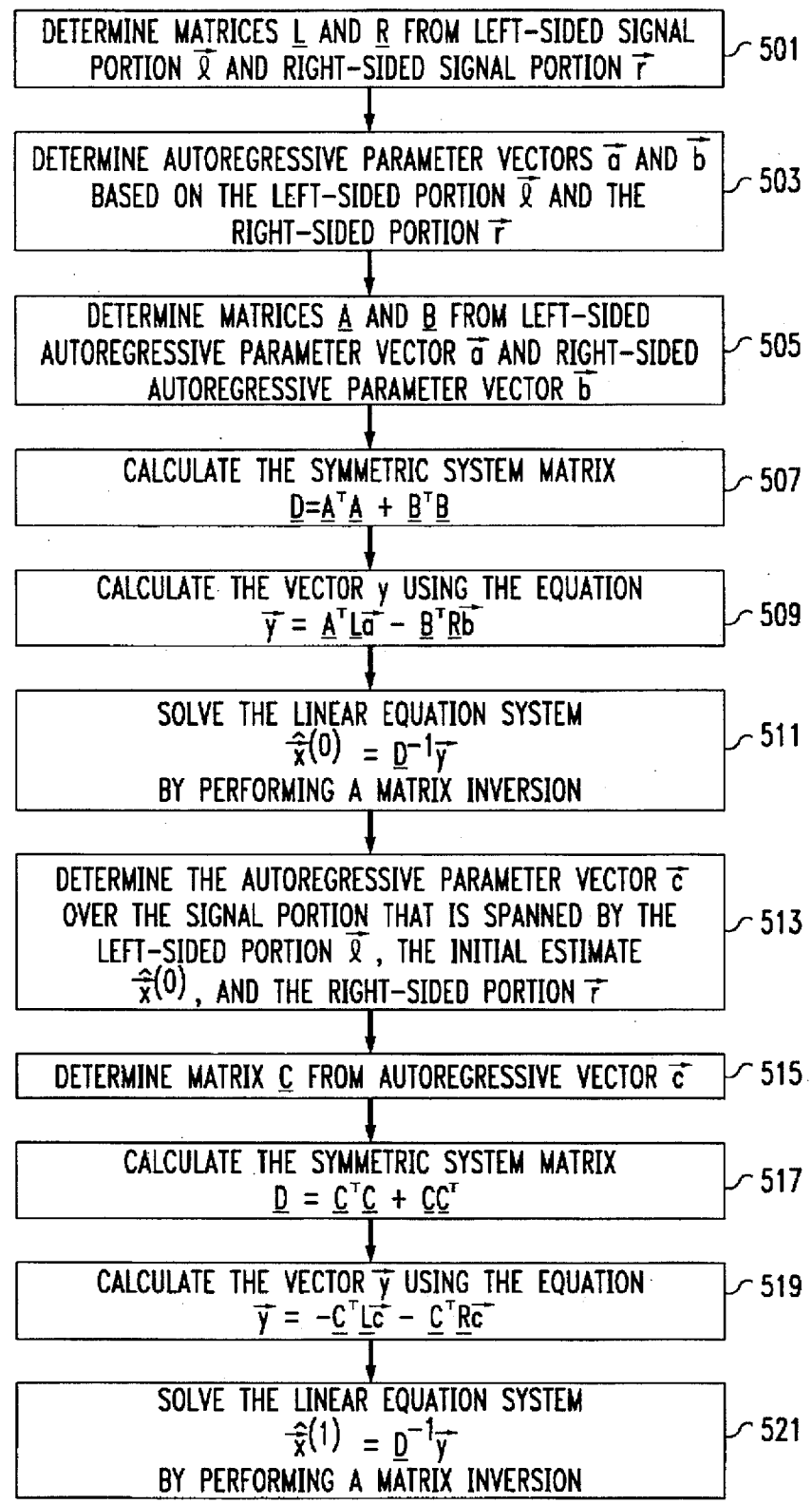
FIG. 3 is a software flowchart describing a second operational sequence for restoring a degraded signal according to an embodiment disclosed herein.

Refer now to FIG. 3 which is a software flowchart describing an operational sequence for restoring a degraded signal according to a second embodiment disclosed herein. At block 501, the matrices L and R are determined from the left-sided signal portion $\vec{l}$ and from the right-sided signal portion $\vec{r}$. Also, the left-sided and right-sided signal portions are used to determine the left-sided and right-sided autoregressive parameter vectors $\vec{\alpha}$ and $\vec{b}$ (block 503). The matrices A and B can then be determined at block 505. Using equation (25), the system matrix D is calculated (block 507) and using equation (26), the vector $\vec{y}$ is calculated (block 509). At block 511, the linear equation system (24) is solved by inverting the system matrix to provide the initial estimate $\hat{\vec{x}}^{(0)}$, for the missing signal vector. Using the signal portion that is spanned by the left-sided portion $\vec{l}$, the initial estimate $\hat{\vec{x}}^{(0)}$ and the right-sided portion $\vec{r}$, a new parameter vector $\vec{c}$ is determined at block 513. In the same way as matrix A was obtained from vector $\vec{\alpha}$, the matrix C is obtained from vector $\vec{c}$. The system matrix is recalculated at block 517 based on the matrix C. Also, the vector $\vec{y}$ is recalculated at block 519. Finally, the linear equation system is solved by inverting the system matrix D at block 521.

Note that FIG. 3 shows an iterative algorithm which performs only one iteration based on an initial signal estimate. However, blocks 513, 515, 517, 519 and 521 can also be repeated until the signal estimate convergences, i.e., until the difference of two succeeding signal estimates approaches zero. One particular reason why this iterative approach is likely to improve the signal estimate is based on the fact that the number of available samples determines the accuracy of the autoregressive parameter estimates. While $\vec{a}$ and $\vec{b}$ are determined based on $N_L$ and $N_R$ samples, $\vec{c}$ can be determined based on $N_L+M+N_R$ samples. Improved accuracy is most likely to result if the model order K is close to $N_L$ or $N_R$ since, in such a case, the autocorrelation parameters with higher indices are less reliable and, in turn, affect the accuracy of the resulting AR parameters. Hence, applying equations (24), (25) and (26) again, or recursively, could improve the initial estimate $\hat{x}$.

Figure 4:
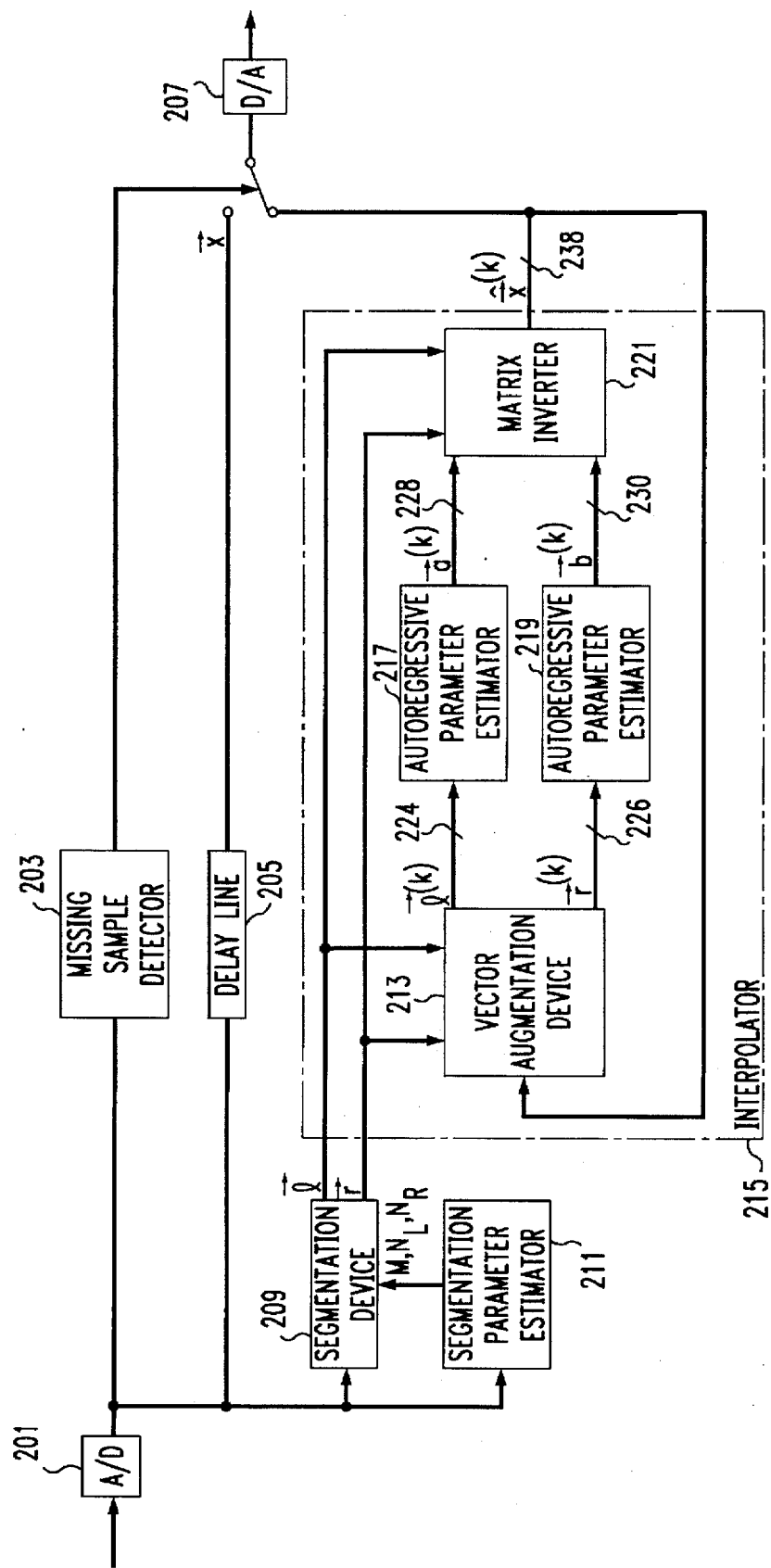
FIG. 4 is a hardware block diagram showing a first embodiment of a signal interpolator equipped to perform the operational sequences of FIG. 2.

FIG. 4 is a hardware block diagram showing a preferred embodiment of a signal interpolator equipped to perform the interpolation methods disclosed herein. An A/D converter 201 converts an analog input signal into a digitized source signal. The digitized source signal is coupled to the input of a missing sample detector 203, and also to the input of a delay line 205. Missing sample detector 203 determines whether or not any samples are missing from the digitized source signal, as may happen in the case of a corrupted analog input signal. If no samples are missing from the digitized source signal, the missing sample detector 203 switches delay line 205 into the signal path of the digitized source signal, and the output of delay line 205 is converted back to analog form by D/A converter 207.

If one or more samples are missing from the digitized source signal, then missing sample detector 203 directs the digitized source signal to an interpolator 215. In this manner, missing sample detector 203 determines, either periodically or continuously, whether the digitized source signal is to be restored by the interpolator or, alternatively, whether the digitized source signal is to remain unprocessed and merely pass through delay line 205.

Delay line 205 is employed to compensate for the delay that is inherent in practical interpolator 215 devices that are equipped to perform two-sided interpolation. The restored signal constructed by interpolator 215 and/or the unprocessed signal delayed by delay line 205, respectively, are converted to analog form by D/A converter 207. However, note that, for applications where an input signal is available in digital form, A/D converter 201 and D/A converter 207 are not required. Digital input signals are available from data storage devices that employ digital formats, such as digital cassette tapes recorded in the DAT format, conventional compact discs (CDs), or conventional hard disks used in conjunction with personal computers. Note that D/A converter 207 is not required if the signal restored by interpolator 215 is to be digitally stored or subjected to further digital signal processing. If D/A converter 207 is not employed, a digitized output signal is taken from the output 238 of interpolator 215 or from the output of the delay line 205.

Upon detecting one or more missing samples at missing sample detector 203, the output of A/D converter is processed by interpolator 215, and the interpolated output of interpolator 215 is switched to D/A converter 207. The output of A/D converter 201 is coupled to a segmentation device 209 and a segmentation parameter estimator 211. Based upon the digitized signal at the output of A/D converter 201, the segmentation device 209 determines $\vec{l}$, the left-sided portion 107 (FIG. 1) corresponding to a given missing segment 109 as detected by missing sample detector 203. The segmentation device 209 also determines $\vec{r}$, the right-sided portion 111 corresponding to the given missing segment. In this manner, a signal x(i), representing a corrupted input signal, is segmented into a left-sided sample vector $\vec{l}$ and a right-sided sample vector $\vec{r}$ by segmentation device 209. Segmentation parameter estimator 211 estimates $N_L$, $N_R$, and M, wherein $N_L$ represents the number of samples to be included in the left-sided portion 107, $N_R$ represents the number of samples to be included in the right-sided portion 111, and M represents the number of samples to be included in the missing segment 109.

$\vec{l}$, the left-sided sample vector generated by segmentation device 209 and $\vec{r}$, the right-sided sample vector generated by segmentation device 209, are coupled to a vector augmentation device 213 and also to a matrix inverter 221. Vector augmentation device 213 prepares the initial augmented left-sided sample vector 113 (FIG. 1), represented mathematically as $\vec{l}^{(0)}=\vec{l}$, initial augmented right-sided sample vector 115, represented as $\vec{r}^{(0)}=\vec{r}$, first augmented left-sided sample vector 117, represented as $\vec{l}^{(1)}$ first augmented right-sided sample vector 119, represented as $k^{th}$ augmented left-sided sample vector 121 represented as $\vec{l}^{(k)}$, and $k^{th}$ augmented right-sided sample vector $\vec{r}^{(k)}$.

Initial augmented left-sided sample vector 113 (FIG. 1), represented mathematically as $\vec{l}^{(0)}$ first augmented left-sided sample vector 117, represented as $\vec{l}^{(1)}$ and $k^{th}$ augmented left-sided sample vector 121 and 224 (FIG. 4) represented as $\vec{l}^{(k)}$, are coupled to autoregressive parameter estimator 217, which estimates autoregressive parameters for the left-sided sample vectors. Augmented right-sided sample vector 115, represented as $\vec{r}^{(0)}$, first augmented right-sided sample vector 119, represented as $\vec{r}^{(1)}$ and $k^{th}$ augmented right-sided sample vector 121 and 226 (FIG. 4) represented as $\vec{r}^{(k)}$, are coupled to autoregressive parameter estimator 219, which estimates autoregressive parameters for the right-sided sample vectors.

The output 228 of autoregressive parameter estimator 217 is represented mathematically by a vector $\vec{\alpha}^{(k)}$, and the output 230 of autoregressive parameter estimator 219 is represented mathematically by a vector $\vec{b}^{(k)}$. Output 228, representing vector $\vec{\alpha}^{(k)}$, and output 230, representing vector $\vec{b}^{(k)}$, are coupled to a matrix inverter 221. The output of segmentation device 209, representing augmented sample vectors, is also coupled to the matrix inverter 221. The output of matrix inverter 238, denoted as vector $\hat{x}^{(k)}$ represents an estimated signal for missing segment 109 (FIG. 1). This estimated signal is coupled back to vector augmentation device 213. Taken together, vector augmentation device 213, autoregressive parameter estimator 217, autoregressive parameter estimator 219, and matrix inverter 221 comprise an interpolator 215.

Figure 5:
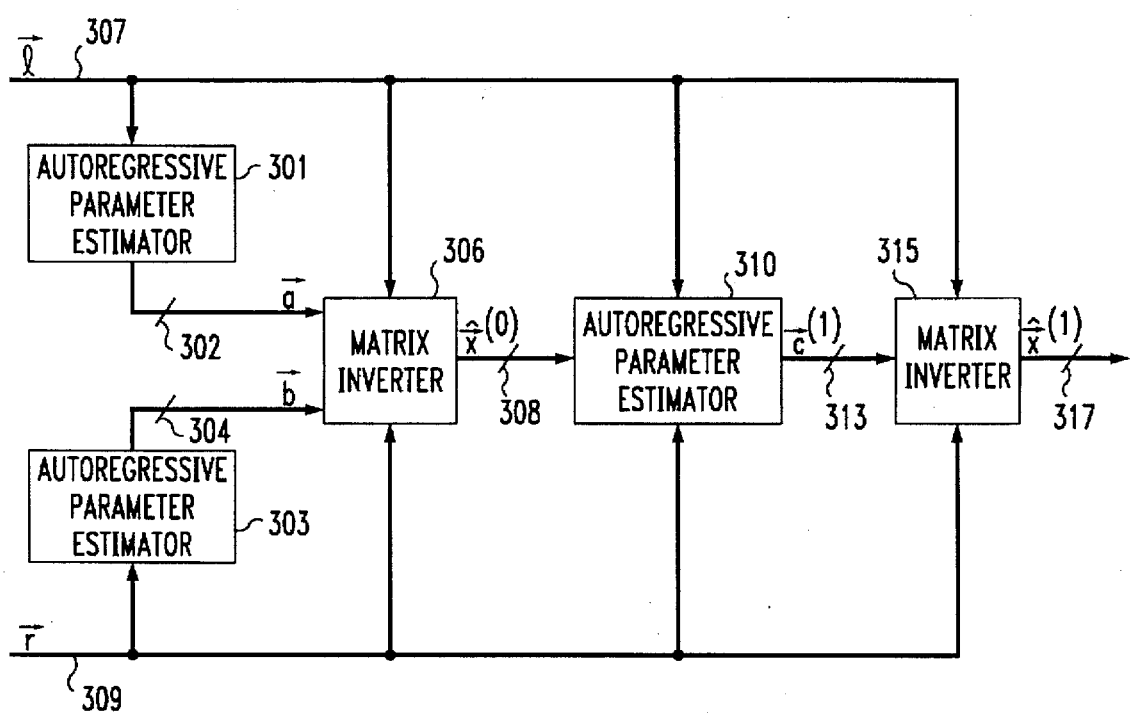
FIG. 5 is a hardware block diagram illustrating a second embodiment of a signal interpolator that is useful in the context of real-time applications and is equipped to perform the operational sequences of FIG. 3.

FIG. 5 sets forth an alternate hardware embodiment for the interpolator 215 block shown in FIG. 4. The hardware embodiment of FIG. 5 is especially well-suited for real-time applications. The interpolator 320 of FIG. 5 accepts a first input signal on first input terminal 307. This first input signal represents $\vec{l}$, the left-sided portions 107 (FIG. 1) corresponding to missing segments 109. The interpolator 320 accepts a second input signal on a second input terminal 309. This second input signal represents $\vec{r}$, the right-sided portions 111 corresponding to missing segments 109. In this manner, a signal x(i), representing a corrupted input signal, is segmented into a left-sided sample vector $\vec{l}$ and a right-sided sample vector $\vec{r}$, and the device of FIG. 5 uses these sample vectors to determine an estimate for missing segment 109.

Input terminal 307 is coupled to an autoregressive parameter estimator 301, and input terminal 309 is coupled to an autoregressive parameter estimator 303. The output 302 of autoregressive parameter estimator 301, mathematically denoted as vector $\vec{a}$, represents estimated autoregressive parameters determined from left-sided sample vectors. The output 304 of autoregressive parameter estimator 303, denoted as $\vec{b}$, represents estimated autoregressive parameters determined from right-sided sample vectors. Input terminal 307, input terminal 309, output 302, and output 304 are coupled to a matrix inverter 306.

Matrix inverter 306 determines and generates an initial estimate, $\hat{x}^{(0)}$, for the missing segment on output 308. This initial estimate is coupled to autoregressive parameter estimator 310. Input terminal 307 and input terminal 309 are also coupled to autoregressive parameter estimator 310. Based upon signals received from input terminal 307, input terminal 309, and matrix inverter output 308, the autoregressive parameter estimator 310 calculates an autoregressive parameter vector, denoted as $\vec{c}$, on autoregressive parameter estimator output 313. Autoregressive parameter estimator output 313 is coupled to a matrix inverter 315. Input terminal 307 and input terminal 309 are also coupled to matrix inverter 315. Based upon signals received from these input terminals, and also based upon signals received from the autoregressive parameter estimator 310 and representing $\vec{c}$, the matrix inverter 315 generates a final estimate, $\hat{x}^{(1)}$, for missing segment 109 on output terminal 317.

The interpolation techniques disclosed herein have been compared with prior art techniques in the context of a controlled experiment. 20 seconds of a speech signal (a male speaker) were sampled from a conventional compact disc, and 20 seconds of a musical signal (a guitar) were also sampled from a compact disc. Sampling was performed by playing back the compact discs on a conventional consumer-grade compact disc player, and sampling the resulting analog audio output using a sampling rate of 8 kHz. An illustrative example of a sampled speech signal is shown in FIG. 6A.

This speech signal represents the phoneme transition from the /n/ sound to the /a/ sound. A 20 ms portion of the sampled signal was deliberately corrupted by replacing the sampled data with zeroes. FIG. 6B shows a corrupted waveform prepared from the waveform of FIG. 6A.

FIG. 6C is a waveform representing a signal that was restored from the waveform of FIG. 6B using the least squares residual predictor. This technique provides a reconstructed signal (FIG. 6C) having a signal-to-noise ratio of 7.9 dB. The restored signal portion is identical with the initial signal estimate used for the iterative least squares predictors.

FIG. 6D is a waveform representing a signal that was restored from the waveform of FIG. 6B using a technique disclosed herein, which is a special realization of the iterative least squares residual predictor. It represents the output obtained from an algorithm according to the software flowchart in FIG. 3 or the hardware implementation in FIG. 5. This technique provides a reconstructed signal (FIG. 6D) having a signal-to-noise ratio of 9.4 dB. Note that this signal-to-noise ratio is higher than achieved for any of the prior-art techniques described in conjunction with FIGS. 6C and 6F–6K.

FIG. 6E is a waveform representing a signal that was restored from the waveform of FIG. 6B using a technique disclosed herein, which may be referred to as the iterative least squares residual predictor. However, this is the signal obtained when blocks 513–521 in FIG. 3 are repeated until convergence is reached. For this particular signal, 3 iterations were necessary for convergence. This technique provides a reconstructed signal (FIG. 6E) having a signal-to-noise ratio of 9.7 dB. Note that this is the highest signal-to-noise ratio.

FIG. 6F is a waveform representing a signal that was restored from the waveform of FIG. 6B using a technique disclosed herein, which may be referred to as the weighted forward-backward predictor (Appendix B). This technique provides a reconstructed signal (FIG. 6F) having a signal-to-noise ratio of 4.8 dB.

FIG. 6G is a waveform representing a signal that was restored from the waveform of FIG. 6B using a prior-art technique known as the iterative forward predictor, where the number of iterations is five. This technique provides a reconstructed signal (FIG. 6G) having a signal-to-noise ratio of 3.6 dB.

FIG. 6H is a waveform representing a signal that was restored from the waveform of FIG. 6B using a prior-art technique known as the periodicity optimized predictor. This technique provides a reconstructed signal (FIG. 6H) having a signal-to-noise ratio of 3.5 dB. FIG. 6I is a waveform representing a signal that was restored from the waveform of FIG. 6B using a prior art technique known as the iterative pseudo inverse predictor, where three iterations were performed. This technique provides a reconstructed signal (FIG. 6I) having a signal-to-noise ratio of 8.7 dB.

FIG. 6K is a waveform representing a signal that was restored from the waveform of FIG. 6B using a prior-art technique referred to as the weighted repetitive substitution predictor. This technique provides a reconstructed signal (FIG. 6K) having a signal-to-noise ratio of 6.2 dB.

FIGS. 7A and 7B are graphs showing signal-to-noise ratio versus the duration of the restored segment for speech and music signals, respectively. For each type of signal (speech and music), the graphs compare the average signal-to-noise ratio provided by the techniques disclosed herein with the average signal-to-noise ratios provided by various prior art methods. These averages were calculated over 200 restored segments. FIGS. 7A and 7B provide experimental verification of the performance of the signal restoration techniques disclosed herein.

The prior-art signal restoration methods referred to in FIGS. 6C and 6F–6K, and portions of FIGS. 7A and 7B as well, are characterized as follows: The weighted forward-backward predictor is described in Appendix B; the iterative forward predictor is described in Appendix C, the periodicity optimized predictor is described in Appendix D, and the pseudo inverse predictor, which has been applied iteratively, is described in Appendix E. The repetitive substitution predictor is described in Appendix F.

Interpolation techniques are often comparatively evaluated by determining the relative quadratic interpolation error of the technique or techniques to be evaluated. The relative quadratic interpolation error is given by $$e^2(l) = \frac{\sum_{j=0}^{M-1}(x(l+j)-\hat{x}(l+j))^2}{\sum_{j=0}^{M-1}x^2(l+j)}.$$

Considering the absolute interpolation error as noise, the signal-to-noise ratio is defined as $$SNR(l) = 10 \cdot \log_{10}\frac{1}{e^2(l)}.$$

For the iterative methods, a convergence criterion is defined, based upon the signal estimates at iteration k and k−1. At each iteration, calculate the convergence measure $$\rho = \frac{\sum_{i=l}^{l+M-1}(\hat{s}^{(k)}(i) - \hat{s}^{(k-1)}(i))^2}{\sum_{i=l}^{l+m-1}(\hat{s}^{(k)}(i))^2}$$

The iteration ceases when p>0.1%.

Note that FIGS. 6A–6K, 7A, and 7B summarize the experimental results obtained by comparatively evaluating various signal restoration techniques. The actual comparative evaluation procedure utilized a speech signal of 20 seconds duration 200 segments of length $\Gamma_R$ were set to zero; i.e., the signal was corrupted every 100 ms. This degradation procedure was performed 5 times to vary the length $\Gamma_R$ of the lost data from 1.25 ms up to 20 ms. To obtain a performance measure, the average signal-to-noise ratio was calculated over all reconstructed segments for every restoration method and every restoration length.

Before comparing the various interpolation techniques, it is important to ensure that an appropriate value of K is utilized for correlation-based and autoregressive-parameter-based techniques. In this context, K represents the order of the autoregressive model to be employed. It is not always appropriate to apply conventional methods of estimating K to the techniques disclosed herein. Experiments indicate that if a large model order is selected, such that K>>M, the interpolation is sometimes based on samples which are not correlated with the missing samples. On the other hand, if a small model order is selected, such that K<<M, the estimated signal fades out towards the middle of the missing segment. This is most obvious for the weighted forward-backward predictor where the excitation of the autoregressive model is set to zero: each of the two linear predictors will have a response to the K input samples, which will die out more or less quickly depending on K and on how close the zeros of the predictors are to the unit circle in the z-domain.

Some prior art approaches select the model order to be proportional to the number of missing samples as, for example, K=min {3M+2,50}. In the context of the techniques disclosed herein, the model order was determined empirically, based upon the influence of the order K on the average signal-to-noise ratio for different restoration lengths $\Gamma_R$ for various predictors. These empirical determinations reveal that, rather than choosing a model order K proportional to the number of missing samples M, it is generally preferable to choose a larger order over a smaller order, if it is practicable to do so. For some commonly-occurring signal restoration problems, the maximum average signal-to-noise ratio is obtained when the order is between 40<K<160. For purposes of comparing the techniques shown in FIGS. 7A and 7B, a value of 80 was selected for K. This value was applied for all restoration lengths.

An important property of an iterative algorithm is its convergence behavior. For a real-time application, it is important that the iterative algorithm converges after only a few iterations in order to keep the computational complexity reasonably low. In the iterative least squares residual predictor shown in FIG. 3, only one iteration is performed. By performing only one iteration, it is assumed that after one iteration a signal estimate is obtained that is close to the converged signal estimate. To check this assumption, the results obtained after one iteration are compared with the results obtained for the converged signal. To obtain the converged signal, blocks 513–521 have to be repeated until convergence is reached. Table 1 shows the average signal-to-noise ratio obtained after one iteration and obtained for the converged signal estimate. In addition, the average signal-to-noise ratio of the initial estimate obtained from the least squares residual predictor, i.e., the output at block 511, is given. The converged signal and the signal obtained after one iteration reach similar average signal-to-noise ratios. For speech signals, it is even better to stop after the first iteration. Further iterations do slightly degrade the average signal-to-noise ratios. For the music signal, a slightly better average signal-to-noise ratio is obtained for the converged signal. Clearly, there is no need for more than one additional iteration, since it does not, when at all, significantly improve the average signal-to-noise ratio.

These experiments show that the minimum interpolation error occurs after only one iteration, rendering this iterative method well-suited to real-time applications. Moreover, one additional iteration, as performed by block 513–521 in FIG. 3 does significantly reduce the interpolation error over the initial signal estimate obtained from block 511.

The results shown in FIGS. 7A and 7B are as follows. For a speech signal, the two iterative least squares residual predictors achieve the best results. The performance decreases for the weighted forward-backward predictor and for the iterative forward predictor. The iterative pseudo inverse predictor achieves good results where the length of the missing segment to be restored is relatively short, but poorer results are achieved where the length of the missing segment is relatively long. This drop in performance is not caused by any sensitive inverse matrix calculations. Note that, for all lengths, the matrix to be inverted is of the size 2K×2K. Rather, it is caused by modeling the left-sided and right-sided portion by one autocorrelation vector.

The two estimators that are based on pitch information, namely, the repetitive substitution predictor and the periodicity optimized predictor, perform more poorly than the remaining techniques shown in FIGS. 7A and 7B. For most signals, the iterative least squares residual predictor and the iterative pseudo inverse predictor achieve the best performance. All of the techniques shown in FIGS. 7A and 7B achieve higher signal-to-noise ratios for music signals relative to speech signals. In the context of speech signals, periodicity-based techniques provide lower signal-to-noise ratios than other techniques. Some of the prior art techniques referred to in FIGS. 7A and 7B incorrectly assume that music signals are relatively periodic in nature. However, actual music signals typically do not have a well-defined periodic structure.

Another conclusion from FIGS. 7A and 7B concerns the least squares residual techniques. The performance of additional iterations, although based upon a single autoregressive model, may result in further improvements to the average signal-to-noise ratio. The reason for this improvement is twofold: First, both speech and music often contain stationary sequences that can be well-represented by a single autoregressive model. Second, as previously mentioned, the autoregressive parameter estimate becomes increasingly reliable as the number of samples that the estimate is based upon is increased. However, it is often advantageous to utilize two autoregressive models in the initial step. Experiments with only one autoregressive model showed a decrease in the average SNR.

To determine the relevance of the average signal-to-noise ratio in determining overall sound quality as perceived by humans, the restored signals have been evaluated by human listeners. Signal-to-noise ratio does, indeed, correlate very strongly with perceived sound quality. In some special situations, the use of a K having an order higher than 80 may be beneficial. One such situation arises in the context of 20 ms gaps. For AR-parameter based methods, a model order K=160 (K/M=1) produces better results than K=80 (K/M= 0.5). For K=80, the AR model based estimators resulted in a reduced signal level towards the middle of the interpolated gap, which introduced a periodic modulation that occurred at the rate of the disturbance, i.e., every 100 ms. As already mentioned in this section, this effect becomes worse when the order K gets smaller compared to the number of missing samples M.

A second signal characteristic that is not well represented in the average signal-to-noise ratio relates to artifacts introduced by transitions that may occur at either (or both) ends of a restored signal, due to a mismatch between the restored segment and the remaining portions of the signal. These transitions lead to audible clicks or pops. In the example discussed in conjunction with FIGS. 6B, 7A and 7B, where 200 missing segments are to be restored, these clicks occur most often for repetitive substitution as well as for the periodicity optimized predictor. These clicks occur, but very rarely, if the iterative forward predictor is used. Although this estimator determines the AR parameters from both preceding and succeeding samples, the interpolation involves purely forward prediction and, consequently, a poor match could potentially occur at the right side of the restored segment. For the least squares residual predictors, the weighted forward-backward predictor and the iterative pseudo inverse predictor, no audible clicks occur, which makes these predictors much more attractive.

An inconsistency between the average signal-to-noise ratio and the perceived sound quality results in the environment of a restored signal that exhibits an average signal-to-noise ratio below 0 dB (e.g. repetitive substitution for 20 ms gap) with a replacement by zeros (zero substitution), which provides a signal-to-noise ratio of 0 dB. Nevertheless, these restored signals clearly sound better than zero substitution. Note that zero substitution may lead to sharp transients on one or on both ends of the substituted interval. Even where these transients are minimized by fading the signal out prior to the zero-substituted interval and fading it in afterwards, human listeners still preferred the restored signal with a negative average signal-to-noise ratio.

To fine-tune the parameters of the interpolation techniques disclosed herein, the average signal-to-noise ratio provides a useful means of comparative evaluation. But a complete evaluation of an algorithm requires a listening test as well. Listening experiments were performed using restored signals to fill missing segments of 5 ms, 10 ms and 20 ms in duration, 200 gaps within 20 seconds, to provide a clearer picture of the operational capabilities of the techniques disclosed herein. For 5 ms gaps, the iterative least squares residual predictor, the non-iterative least squares residual predictor, the weighted forward-backward predictor, and the iterative pseudo inverse predictor each produced restored signals that could not be distinguished from the original speech signal. All of these predictors performed similarly for 10 ms gaps: the restored signal was of good quality, but some slight degradation against the original was observed. For 20 ms gaps, the perceived degradation in sound quality became more severe, but was still acceptable. As to the remaining prior-art prediction techniques, these all introduced audible clicks due to bad matches at the borders of the gaps.

Based on the interpolation error and on the listening test, the iterative least squares residual predictor is the best choice among all the restoration techniques disclosed herein. This algorithm does not only perform better than its major competitor the iteratively applied pseudoinverse predictor, it has much better convergence properties. It requires only one iteration, rendering this method well-suited to real-time applications.

In summary, interpolation techniques are disclosed herein that are based upon left-sided and right-sided AR-parameter vectors. Hence, the signal is not required to be stationary over the whole missing segment as was assumed for prior art techniques. This relaxation becomes important when the length of the missing segment is on the order of the stationarity duration of the signal. The introduced interpolation technique minimizes the squared residuals of the estimated signal given the AR-parameter vectors on both sides. The comparison among seven restoration algorithms showed that for the iterative algorithms, the best performance is achieved by the iterative least squares residual predictor, while for the non-iterative algorithms, the least squares residual predictor scores best. The superiority of these new interpolation techniques with respect to the interpolation error and the resulting sound quality has been verified for speech and music signals.

Based upon the interpolation error and on the listening test, the iterative least squares residual predictor disclosed herein provides better signal restoration performance than prior art techniques disclosed herein. This algorithm not only performs better than its major competitor, the iteratively-applied pseudoinverse predictor, it also has much better convergence properties. It requires only one iteration, rendering this method well-suited to real-time applications.

In summary, interpolation techniques are disclosed herein that are based upon left-sided and right-sided autoregressive parameter vectors. The signal is not required to be substantially stationary over the whole missing segment, unlike prior art techniques which rely upon the assumption that such signal stationarity exists. The relaxation of this stationarity assumption enables the missing portion of the signal to be accurately restored even when the length of the missing segment is on the order of the duration for which the signal remains substantially stationary. The interpolation techniques disclosed herein minimize the squared residual error of the estimated signal when two sets of autoregressive parameters are employed to represent known signal portions on either side of the missing portion of the signal. The comparison among seven signal restoration methods showed that for the iterative methods, the best performance is achieved by the iterative least squares residual predictor, while for the non-iterative methods, the least squares residual predictor scores best. The superiority of the signal restoration techniques disclosed herein, as evaluated with respect to interpolation error and the resulting perceived sound quality, has been verified for speech and music signals.

APPENDICES

APPENDIX A Derivation of the Least Squares Residual Predictor Utilized in the Embodiments Disclosed Herein:

In order to derive an algorithm that relaxes the requirement for short-term signal stationarity, the following autoregressive model is utilized for forward prediction:

$$x(i) = \sum_{j=1}^{k} a_j x(i-j) + u(i) \quad (1)$$

This forward prediction is represented in matrix notation as $$\vec{\hat{x}}_L = \underline{\tilde{X}}_L \cdot \vec{\alpha} + \vec{\hat{u}}_L \quad (2)$$

where $$\vec{\hat{x}}_L = [\hat{x}_L(l)\hat{x}_L(l+1) \ldots \hat{x}_L(l+M-1)]^T, \quad (3)$$

$$\underline{\tilde{X}}_L = \begin{pmatrix} 0 & x(l-1) & x(l-2) & \ldots & x(l-K) \\ 0 & \hat{x}_L(l) & x(l-1) & \ldots & x(l-K+1) \\ 0 & \hat{x}_L(l+1) & \hat{x}_L(l) & \ldots & x(l-K+2) \\ \cdot & \cdot & \cdot & & \cdot \\ \cdot & \cdot & \cdot & & \cdot \\ \cdot & \cdot & \cdot & \cdot & x(l-1) \\ \cdot & \cdot & \cdot & & \cdot \\ 0 & \hat{x}_L(l+K-1) & \hat{x}_L(l+K-2) & \ldots & \hat{x}_L(l) \\ \cdot & \cdot & \cdot & & \cdot \\ \cdot & \cdot & \cdot & & \cdot \\ 0 & \hat{x}_L(l+M-2) & \hat{x}_L(l+M-3) & \ldots & \hat{x}_L(l+M-1-K) \end{pmatrix}$$

and $$\vec{\alpha} = [\alpha_0 \alpha_1 \ldots \alpha_k]^T, \alpha_0 = -1,$$

$$\vec{\hat{u}}_L = [\hat{u}_L(l)\hat{u}_L(l+1) \ldots \hat{u}_L(l+M-1)]^T.$$

Equation (2) contains known portions of the signal, $$\{x(l-1) \; x(l-2) \ldots x(l-K)\},$$

as well as missing segments of the signal $$\{\hat{x}_L(l)\hat{x}_L(l+1) \ldots \hat{x}_L(l+M-1)\},$$

which are to be estimated. If these equations are separated into two matrices, we obtain from equation (5)

$$(\underline{L} + \underline{\hat{X}}_L) \cdot \vec{\alpha} + \vec{\hat{u}}_L = \vec{0},$$

where L is an M×(K+1) matrix, $$\underline{L} = \begin{pmatrix} 0 & x(l-1) & x(l-2) & \ldots & x(l-K) \\ 0 & 0 & x(l-1) & \ldots & x(l-K+1) \\ 0 & 0 & 0 & \ldots & x(l-K+2) \\ \cdot & \cdot & \cdot & & \cdot \\ \cdot & \cdot & \cdot & & \cdot \\ \cdot & \cdot & \cdot & \cdot & x(l-1) \\ \cdot & \cdot & \cdot & & \cdot \\ 0 & 0 & 0 & \ldots & 0 \\ \cdot & \cdot & \cdot & & \cdot \\ \cdot & \cdot & \cdot & & \cdot \\ 0 & 0 & 0 & \ldots & 0 \end{pmatrix}$$

and $\hat{X}_L$ is an M×(K+1) matrix containing the forward-predicted portions of the signal, $$\underline{\hat{X}}_L = \begin{pmatrix} \hat{x}_L(l) & 0 & \ldots & 0 \\ \hat{x}_L(l+1) & \hat{x}_L(l) & \ldots & 0 \\ \hat{x}_L(l+2) & \hat{x}_L(l+1) & \ldots & 0 \\ \cdot & \cdot & & \cdot \\ \cdot & \cdot & & \cdot \\ \cdot & \cdot & & 0 \\ \cdot & \cdot & & \cdot \\ \hat{x}_L(l+K) & \hat{x}_L(l+K-1) & \ldots & \hat{x}_L(l) \\ \cdot & \cdot & & \cdot \\ \cdot & \cdot & & \cdot \\ \hat{x}_L(l+M-1) & \hat{x}_L(l+M-2) & \ldots & \hat{x}_L(l+M-1-K) \end{pmatrix}$$

Due to the fact that $\alpha_0 = -1$, the vector $\vec{\hat{x}}_L$ from equation (2) may be included in the first column of the matrix $\underline{\hat{X}}_L$. To obtain the conventional notation for a system of linear equations, the product $\underline{\hat{X}}_L$ may be rewritten as $$\underline{\hat{X}}_L \cdot \vec{\alpha} = \underline{A} \cdot \vec{\hat{x}}_L,$$

where A is an M×M matrix, $$A = \begin{pmatrix} a_0 & 0 & 0 & \cdots & \cdots & \cdots & \cdots & \cdots & 0 \\ a_1 & a_0 & 0 & \cdots & \cdots & \cdots & \cdots & \cdots & 0 \\ a_2 & a_1 & a_0 & \cdots & \cdots & \cdots & \cdots & \cdots & 0 \\ \cdot & \cdot & \cdot & & & & & & \cdot \\ \cdot & \cdot & \cdot & & & & & & \cdot \\ \cdot & \cdot & \cdot & & & & & & \cdot \\ a_K & \cdot & & \cdots & \cdots & \cdots & \cdots & & 0 \\ \cdot & \cdot & & & & & & & \cdot \\ 0 & a_K & a_{K-1} & \cdots & \cdots & \cdots & \cdots & 0 & 0 \\ \cdot & \cdot & \cdot & & & & & & \cdot \\ \cdot & \cdot & \cdot & \cdots & & & & & \cdot \\ \cdot & \cdot & \cdot & & & & & & \cdot \\ 0 & \cdot & \cdot & \cdots & \cdots & \cdot & \cdots & a_0 & 0 \\ \cdot & \cdot & & & & \cdot & & & \cdot \\ 0 & 0 & \cdots & \cdots & 0 & a_K & \cdots & a_1 & a_0 \end{pmatrix}$$

With $$\vec{y}_L = -L \cdot \vec{\alpha} - \vec{\hat{u}}_L, \quad (4)$$

and from equation (3), the linear equation system is derived for $\hat{x}_L$:

$$A \cdot \vec{\hat{x}}_L = \vec{y}_L \quad (5)$$

As in the case of forward prediction, for backward prediction, $$\vec{\hat{x}}_R = [\hat{x}_R(1)\hat{x}_R(l+1) \ldots \hat{x}_R(l+M-1)]^T,$$

$$b = [b_0 b_1 \ldots b_K]^T, \quad b_0 = -1,$$

$$\vec{\hat{u}}_R = [\hat{u}_R(l)\hat{u}_R(l+1) \ldots \hat{u}_R(l+M-1)]^T,$$

the M×(K+1) matrix R, $$R = \begin{pmatrix} 0 & 0 & 0 & \cdots & 0 \\ \cdot & \cdot & \cdot & & \cdot \\ \cdot & \cdot & \cdot & & \cdot \\ \cdot & \cdot & \cdot & & \cdot \\ \cdot & \cdot & \cdot & & 0 \\ \cdot & \cdot & \cdot & & \cdot \\ \cdot & \cdot & \cdot & & x(l+M) \\ \cdot & \cdot & \cdot & & \cdot \\ \cdot & \cdot & \cdot & & \cdot \\ 0 & 0 & x(l+M) & \cdots & x(l+M+K-2) \\ 0 & x(l+M) & x(l+M+1) & \cdots & x(l+M+K-1) \end{pmatrix},$$

the M×(K+1) matrix $\hat{X}_R$, $$\hat{X}_R = \begin{pmatrix} \hat{x}_R(1) & \hat{x}_R(l+1) & \cdots & \hat{x}_R(l+K) \\ \hat{x}_R(1) & \hat{x}_R(l+2) & \cdots & \hat{x}_R(l+K+1) \\ \cdot & \cdot & & \cdot \\ \cdot & \cdot & & \cdot \\ \cdot & \cdot & & \cdot \\ \cdot & \cdot & & \hat{x}_R(l+M-1) \\ \cdot & \cdot & & \cdot \\ \cdot & \cdot & & 0 \\ \cdot & \cdot & & \cdot \\ \cdot & \cdot & & \cdot \\ \hat{x}_R(l+M-2) & \hat{x}_R(l+M-1) & \cdots & 0 \\ \hat{x}_R(l+M=1) & 0 & \cdots & 0 \end{pmatrix},$$

and the M×M matrix B, $$B = \begin{pmatrix} b_0 & b_1 & b_2 & \cdots & b_K & 0 & \cdots & \cdots & 0 \\ 0 & b_0 & b_1 & \cdots & \cdots & \cdots & \cdots & \cdots & 0 \\ 0 & 0 & b_0 & \cdots & \cdots & \cdots & \cdots & \cdots & 0 \\ \cdot & \cdot & \cdot & & & & & & \cdot \\ \cdot & \cdot & \cdot & & & & & & \cdot \\ \cdot & \cdot & \cdot & & & & & & \cdot \\ 0 & 0 & 0 & \cdots & \cdots & \cdots & \cdots & b_K & 0 \\ \cdot & \cdot & \cdot & & & & & & \cdot \\ \cdot & \cdot & \cdot & \cdots & & & & b_{K-1} & b_K \\ \cdot & \cdot & \cdot & & & & & & \cdot \\ \cdot & \cdot & \cdot & \cdots & \cdots & & & & \cdot \\ \cdot & \cdot & \cdot & & & & & & \cdot \\ 0 & \cdot & \cdot & \cdots & \cdots & \cdots & \cdots & b_0 & b_1 \\ \cdot & \cdot & & & & & & & \cdot \\ 0 & 0 & \cdots & \cdots & \cdots & \cdots & \cdots & 0 & b_0 \end{pmatrix}$$

Define a vector $$\vec{y}_R = -R \cdot \vec{b} - \vec{\hat{u}}_R,$$

to arrive at the linear equation system for $\vec{\hat{x}}_R$:

$$B \cdot \vec{\hat{x}}_R = \vec{y}_R \quad (6)$$

Note that the matrices A and B are Toeplitz matrices and the matrices A, B, L, R, $\hat{X}_L$, and $\hat{X}_R$, were given for M>K.

To obtain a solution for forward-backward prediction, it is required that $$\vec{\hat{x}} = \vec{\hat{x}}_L = \vec{\hat{x}}_R.$$

Furthermore, the reconstructed portion of the signal should provide a reasonable correspondence with the left-sided and right-sided autoregressive models. In other words, the reconstructed signal should minimize $$\epsilon = \epsilon_L + \epsilon_R, \quad (7)$$

where $$\vec{\epsilon}_L = \hat{\vec{u}}_L^T \hat{\vec{u}}_L \quad (8)$$

and $$\vec{\epsilon}_R = \hat{\vec{u}}_R^T \hat{\vec{u}}_R \quad (9)$$

i.e., the sum of the power from the left-sided and right-sided predicted excitation or, in other words, the residual power. For this purpose, set the derivative of $\epsilon$ with respect to $\hat{\vec{x}}$ equal to zero:

$$\frac{\partial \epsilon}{\partial \hat{\vec{x}}} = \frac{\partial \epsilon_L}{\partial \hat{\vec{x}}} + \frac{\partial \epsilon_R}{\partial \hat{\vec{x}}} = 0. \quad (10)$$

Calculate the derivative $\delta \epsilon_L / \delta \hat{\vec{x}}$. To do so, introduce, similar to equation (4), the vector $$\vec{\tilde{y}}_L - L \vec{\alpha}. \quad (11)$$

Using equation (11) and (5), the vector $\hat{\vec{u}}_L$ in (4) can be written as $$\hat{\vec{u}}_L = \vec{\tilde{y}}_L - A \hat{\vec{x}}_L. \quad (12)$$

If this equation is conceptualized in terms of its elements, $\tilde{y}_L(k)$ ($k=1,2,\ldots,M$) and $A_{kj}$ ($k=1,2,\ldots,M$; $j=1,2,\ldots,M$) being the elements of $\vec{\tilde{y}}_L$ and $A$, respectively, equation (8) results in $$\epsilon_L = \sum_{k=1}^{M} \left( \tilde{y}_L(k) - \sum_{j=1}^{M} A_{kj} \hat{x}(l+j-1) \right)^2.$$

The derivative of $\epsilon_L$ with respect to the h-th element of $\hat{\vec{x}}$ becomes $$\frac{\partial \epsilon_L}{\partial \hat{x}(l+h-1)} = 2 \sum_{k=1}^{M} A_{kh} \left( \tilde{y}_L(k) - \sum_{j=1}^{M} A_{kj} \hat{x}(l+j-1) \right),$$

$$h = 1, 2, \ldots, M,$$

which is $$\frac{\partial \epsilon_L}{\partial \hat{x}(l+h-1)} = 2 \sum_{j=1}^{M} \hat{x}(l+j-1) \sum_{k=1}^{M} A_{kh} A_{kj} - 2 \sum_{k=1}^{M} A_{kh} \tilde{y}_L(k). \quad (13)$$

Similar to equation (11), in the case of backward prediction, $$\vec{\tilde{y}}_R = -R \vec{b} \quad (14)$$

The derivative of the backward residual power has the same form as in the forward case, equation (13). Defining the elements of a matrix $D$ as $$D_{hj} = \sum_{k=1}^{M} A_{kh} A_{kj} + B_{kh} B_{kj}, \quad (15)$$

$$h = 1, 2, \ldots, M;$$
$$j = 1, 2, \ldots, M,$$

and a vector $\vec{y}$ as $$y(h) = \sum_{k=1}^{M} A_{kh} \tilde{y}_L(k) + B_{kh} \tilde{y}_R(k), \quad h = 1, 2, \ldots, M, \quad (16)$$

the derivative of $\epsilon$ with respect to the h-th element of $\hat{\vec{x}}$ becomes $$\frac{\partial \epsilon}{\partial \hat{x}(l+h-1)} = 2 \sum_{j=1}^{M} \hat{x}(l+j-1) \cdot D_{hj} - 2 \cdot y(h). \quad (17)$$

Recalling equation (10), equation (17) leads to $$\sum_{j=1}^{M} \hat{x}(l+j-1) \cdot D_{hj} = y(h), \quad h = 1, 2, \ldots, M \quad (18)$$

Summarizing these results in matrix notation, the following linear system of equations is obtained:

$$D \cdot \hat{\vec{x}} = \vec{y} \quad (19)$$

where $$D = A^T A + B^T B \quad (20)$$

and $$\vec{y} = -A^T L \vec{\alpha} - B^T R \vec{b}. \quad (21)$$

While equations (19) and (20) are the matrix notation of (18) and (15), respectively, equation (21) follows from equations (16), (11) and (14).

APPENDIX B. Weighted Forward-Backward Predictor

The weighted forward-backward predictor uses a linear combination of the left-sided predicted signal $\hat{x}_L(i)$ and right-sided predicted signal $\hat{x}_R(i)$ according to the following equation:

$$\hat{x}_{LR}(i) = \omega_{L,M}(i-l) \cdot \hat{x}_L(i) + \omega_{R,M}(i-l) \cdot \hat{x}_R(i), \quad l \leq i < l+M \quad (22)$$

An often used weighting sequence is the raised-cosine function $$\omega_{L,M}(i) = \begin{cases} 1/2(1 - \cos(\pi(M+i)/M)) & , \text{if } 0 \leq i < M \\ 0 & , \text{elsewhere} \end{cases}$$

and $$\omega_{R,M}(i) = \begin{cases} 1/2(1 - \cos(\pi i/M)) & , \text{if } 0 \leq i < M \\ 0 & , \text{elsewhere} \end{cases}$$

The left-sided predicted signal can be obtained by solving the equation $$A \cdot \hat{\vec{x}}_L = -L \vec{\alpha}$$

and the right-sided predicted signal can be obtained by solving the equation $$B \cdot \hat{\vec{x}}_R = -R \vec{b}$$

$A$ and $B$ represent the AR-parameter matrices, $\vec{\alpha}$ and $\vec{b}$ represent the AR-parameter vectors, and $L$ and $R$ represent the signal matrices obtained from the left-sided and right-sided signal.

APPENDIX C. Iterative Forward Predictor

This algorithm was presented by Janssen et at. It models the signal $x(i)$ as an AR process. Therefore, the excitation (synthesis) or residual (analysis) can be written as $$u(i) = -\sum_{j=0}^{K} c_j x(i-j); \quad c_0 = -1.$$

If the signal $x(i)$ is considered to be short-time stationary from $i=l-K$ to $i=l+M+K-1$, it can be modeled by a single AR process and its excitation can be expressed in matrix notation as $$\vec{u} = -\bar{X}\vec{c},$$

where $$\vec{c} = [c_0\ c_1\ c_2\ \ldots\ c_K]^T,$$
$$\vec{u} = u(l-K)\ u(l-K+1)\ \ldots\ u(l+M+K-1)]^T,$$

and $\bar{X}$ represents the signal matrix containing all samples from $i=l-K$ up to $i=l+M+K-1$.

One approach to determine the vector $$\vec{x} = x(l)x(l+1)\ \ldots\ x(l+M-1)]^T$$

as well as the AR-parameter vector $\vec{c}$ is to minimize the estimation error, which is $$\epsilon(\vec{c},\vec{x}) = \vec{u}^T\vec{u} = \vec{c}^T\bar{X}^T\bar{X}\vec{c}.$$

However, the minimization of $\epsilon(\vec{c},\vec{x})$ with respect to $\vec{c}$ and $\vec{x}$ is a nontrivial problem. A suboptimal solution is obtained by the following iterative approach:

1. $\dfrac{\partial \epsilon(\vec{c},\hat{\vec{x}}^{(k-1)})}{\partial \vec{c}} = 0 \rightarrow \hat{\vec{c}}^{(k)}$ 2. $\dfrac{\partial \epsilon(\hat{\vec{c}}^{(k)},\vec{x})}{\partial \vec{x}} = 0 \rightarrow \hat{\vec{x}}^{(k)}$ where $\hat{\vec{x}}^{(k)} = \{\hat{x}^{(k)}(l), \hat{x}^{(k)}(l+1), \ldots \hat{x}^{(k)}(l+M-1)\}$ and $\hat{\vec{c}}^{(k)}$ are the estimates of the missing signal vector and the AR-parameter vector, respectively, at the k-th iteration. The algorithm is initialized by $\hat{\vec{x}}^{(0)} = \vec{0}$. In the first step, we obtain an estimate for the AR-parameter vector. Based on this AR-parameter vector, the second step provides an estimate for the missing signal vector. The iteration is continued until convergence is reached.

APPENDIX D. Periodicity Optimized Predictor

Veldhuis suggested an optimization criterion for the case of a periodic signal $x(k)$ in the form of $$Q = \sum_{k=q}^{N-1} |x(k) - c \cdot x(k-q)|^2,$$

where $q$ is the number of samples within a period and $c \leq$ is set close to unity. If the derivative of $Q$ with respect to the h-th element of $\hat{\vec{x}}$ is set to zero, we obtain $$\hat{x}(l+h-1) = \dfrac{c}{1+c^2} \cdot (x(l+h-1+q) + x(l+h-1-q)). \quad (23)$$

Thus, for $c=1$ the estimate $\hat{x}(l+h-1)$ is the average of the signal value that occurs one pitch period shifted to the left and one pitch period shifted to the right. Equation (23) can be represented by the following matrix notation:

$$G\vec{x} = \vec{z},$$

where the elements of the M×M matrix G are defined as $$G_{ij} = \begin{cases} 1 & ;\text{if } i=j \\ -c/(1+c^2) & ;\text{if } |i-j|=q \\ 0 & ;\text{elsewhere} \end{cases}$$

and the elements of the vector $\vec{z}$ as $$z(h) = \dfrac{-c}{1+c^2}\ (x(l+h-1-q) + x(l+h-1+q)),$$

$$h = 1, 2, \ldots, M$$

If $x(l+h-1+q)$ is unknown in the last equation, it is set to zero.

Consistent with the Veldhuis reference, we found $c=0.9$ to be a good choice and used this value in our simulations.

APPENDIX E. Iterative Pseudo Inverse Predictor

Consider the system of equations $$H\vec{x} = \vec{y},$$

where $$\vec{x} = x(l-K)x(l-K+1)\ \ldots\ x(l+M+K-1)$$

and $$\vec{y} = y(l-K)y(l-K+1)\ \ldots\ y(l-1)y(l+M)y(l+M+1)\ \ldots\ y(l+M+K-1)$$

Using the pseudoinverse defined by $$H^+ = H^T(HH^T)^{-1},$$

the MMS estimate $\hat{\vec{x}}$ is shown in A. K. Jain, S. Ranganath, "Extrapolation algorithms for discrete signals with application in spectral estimation" IEEE Trans. on ASSP, vol. 29, No. 4, Aug. 1981, to become $$\hat{\vec{x}} = \Phi_x \delta^T (\delta \Phi_x \delta^T)^{-1} \vec{y} \quad (24)$$

where $\Phi_x$ is the autocorrelation matrix and the selection matrix. Since $\Phi_x$ is a K×K matrix, this predictor uses K samples preceding the gap and as many succeeding the gap. Thus, we say K is the order of the algorithm. In our simulation we have applied Equation (24) iteratively. First an initial estimate $\hat{\Phi}^{(0)}$ is determined by setting all missing data to zero. Based on this estimate the data vector $\hat{\vec{x}}^{(0)}$ is calculated. In the next iteration, $\hat{\Phi}_x^{(1)}$ is calculated based on $\hat{\vec{x}}^{(0)}$. The iteration is continued until convergence is reached.

APPENDIX F. Weighted Repetitive Waveform Substitution

The repetitive substitution technique uses a linear combination of the left-sided predicted signal $\hat{x}_L(i)$ and right-sided predicted signal $\hat{x}_R(i)$ according to equation (22). The left-sided and right-sided predicted signals are expressed in terms of the left-sided and right-sided pitch period $q_L$ and $q_R$ as $$\hat{x}_L(i) = x(i - q_L + \text{mod}(i-l,q_L)), \quad l \leq i < l+M \quad (25)$$

and $$\hat{x}_R(i) = x(\text{mod}(K_R \cdot q_L - M + i - l, q_R) + M), \quad l \leq i < l+M \quad (26)$$

The operation mod(x,y) calculates x modulo y, the remainder when x is divided by y. In a speech signal, voiced segments are periodic and can therefore be characterized by a pitch period. For unvoiced segments, the speech signal has no periodicity. In this case, the restoration can be achieved by repeating a signal portion that adjoins the missing segment. This portion may be repeated as many times as necessary to compensate for the missing signal. For the purpose of unifying the voiced and unvoiced case, a constant $q_U$ is used to handle the equations (25) and (26). This constant is chosen to correspond to approximately 5 ms, or the length of the restoration interval, whichever is smaller. To apply the algorithms defined by equations (25), (26) for the unvoiced case, we simply set $q_L=q_U$ and $q_R=q_U$.

The invention claimed is:

1. A signal reconstruction method for reconstructing a missing portion of a signal, the method comprising the steps of:

(a) generating a first estimate of the missing portion of the signal from a first known portion of the signal preceding the missing portion and a second known portion of the signal succeeding the missing portion; and (b) generating a new estimate of the missing portion from the first estimate, from the first known portion of the signal, and from the second known portion of the signal.

2. A signal reconstruction method as set forth in claim 1 further including the step of iteratively repeating step (b) until the new estimate of the missing portion is estimated with a desired level of accuracy.

3. A signal reconstruction method for reconstructing a missing portion of a signal from a first known portion of the signal preceding the missing portion, and a second known portion of the signal succeeding the missing portion, wherein the first known portion of the signal includes a first set of known samples, the second known portion of the signal includes a second set of known samples, and the missing portion of the signal is reconstructed by predicting values for a set of missing samples using the steps of:

(a) representing the first set of known samples using a first autoregressive model and representing the second set of known samples using a second autoregressive model; and (b) generating initial estimates for the missing samples based upon the first autoregressive model and the second autoregressive model.

4. The method of claim 3 wherein step (b) is repeated iteratively to provide final estimates for the missing samples that have a smaller mean-squared error with respect to the missing portion of the signal.

5. The method of claim 3 wherein the first and second autoregressive models predict values for the missing samples in a forward-looking direction, starting from earlier-occurring known samples and progressing to later-occurring known samples.

6. The method of claim 3 wherein the first and second autoregressive models predict values for the missing samples in a backward-looking direction, starting from later-occurring known samples and progressing to earlier-occurring known samples.

7. The method of claim 3 wherein the first autoregressive model predicts values for the missing samples in a forward-looking direction, starting from earlier-occurring known samples and progressing to later-occurring known samples, and the second autoregressive model predicts values for the missing samples in a backward-looking direction, starting from later-occurring known samples and progressing to earlier-occurring known samples.

8. The method of claim 7 further including the steps of:

(a) multiplying each of respective samples in the first set of known samples by a corresponding autoregressive parameter selected from the first autoregressive model to generate a first set of multiplicative products;

(b) multiplying each of respective samples in the second set of known samples by a corresponding autoregressive parameter selected from the second autoregressive model to generate a second set of multiplicative products; and (c) summing each of a plurality of respective multiplicative products in the first set of multiplicative products with corresponding multiplicative products in the second set of multiplicative products to obtain values for each sample in the set of missing samples.

9. The method of claim 3 wherein the first autoregressive model predicts values for the missing samples in a backward-looking direction, starting from later-occurring known samples and progressing to earlier-occurring known samples, and the second autoregressive model predicts values for the missing samples in a forward-looking direction, starting from earlier-occurring known samples and progressing to later-occurring known samples.

10. The method of claim 3 wherein the first and second autoregressive models both predict values for the missing samples in a backward-looking direction, starting from later-occurring known samples and progressing to earlier-occurring known samples, and also from a forward-looking direction, starting from earlier-occurring known samples and progressing to later-occurring known samples.

11. The method of claim 10 further including the steps of:

(a) multiplying each of respective samples in the first set of known samples by a corresponding autoregressive parameter selected from the first autoregressive model to generate a first set of multiplicative products;

(b) multiplying each of respective samples in the second set of known samples by a corresponding autoregressive parameter selected from the second autoregressive model to generate a second set of multiplicative products; and (c) summing each of a plurality of respective multiplicative products in the first set of multiplicative products with corresponding multiplicative products in the second set of multiplicative products to obtain values for each sample in the set of missing samples.

12. The method of claim 3 wherein an initial interpolated signal estimate vector, $\vec{x}^{(0)}$, is generated to represent the missing portion of the signal by applying the following steps:

1) a) representing the first set of known samples in the form of a left-sided sample vector $\vec{l}$, wherein each numerical value of vector $\vec{l}$ represents a corresponding sample value from the first set of known samples; b) Projecting vector $\vec{l}$ into a two-dimensional array to form a matrix denoted as L, such that each entry of matrix L includes a sample value from the first set of known samples; c) representing the second set of known samples in the form of a right-sided sample vector $\vec{r}$, wherein each numerical value of vector $\vec{r}$ represents a corresponding sample value from the second set of known samples; d) projecting vector $\vec{r}$ into a two-dimensional array to form a matrix denoted as R, such that each entry of matrix R includes a sample value from the second set of known samples;

2) generating a left-sided autoregressive parameter vector $\vec{\alpha}$ from left-sided sample vector $\vec{l}$, and generating a right-sided autoregressive parameter vector $\vec{b}$ from right-sided sample vector $\vec{r}$;

3) a) predicting values for the missing set of samples in a forward-looking direction by applying the left-sided autoregressive parameter vector $\vec{\alpha}$ to the first set of known samples, wherein this prediction is expressed mathematically as $L\vec{\alpha}$; b) predicting values for the missing set of samples in a backward-looking direction by applying the right-sided autoregressive parameter vector $\vec{b}$ to the second set of known samples, wherein this prediction is expressed mathematically as $R\vec{b}$;

4) a) predicting values for the missing set of samples in a backward-looking direction by applying the left-sided autoregressive parameter vector $\vec{\alpha}$ to the missing sample values predicted in step 3)a), wherein this prediction is denoted mathematically as $A^T.L\vec{\alpha}$; b) predicting values for the missing samples in a forward-looking direction by applying the right-sided autoregressive parameter vector $\vec{b}$ to the missing sample values predicted in step 3)b), wherein this prediction is denoted mathematically as $B^T.R\vec{b}$; c) summing up corresponding values predicted in step 4)a) with corresponding values predicted in step 4)b), and inverting the summed values to construct a right-hand side vector $\vec{y}$ of a linear equation system, mathematically denoted as $\vec{y}=-A^T.L\vec{\alpha}-B^T.R\vec{b}$;

5) placing the left-sided and right-sided autoregressive parameter vectors $\vec{\alpha}$ and $\vec{b}$ into matrix format, the elements of $\vec{\alpha}$ forming a matrix denoted as A, and the elements of $\vec{b}$ forming a matrix denoted as B, each entry of matrix A representing a left-sided autoregressive parameter and each entry of matrix B representing a right-sided autoregressive parameter;

6) constructing a system matrix D by performing matrix operations on A and B as follows: $D=A^TA+B^TB$; each of the entries in system matrix D representing a specific combination of left-sided and right-sided autoregressive parameters; and 7) solving a linear equation system, denoted as $D.\hat{x}=\vec{y}$, by inverting the matrix D and multiplying the inverted matrix with the right-hand side vector $\vec{y}$ to obtain an initial interpolated signal estimate vector for the missing portion of the signal, denoted as $\hat{x}^{(0)}$.

13. The method of claim 12 further including the steps of:

(a) augmenting the left-sided sample vector $\vec{l}$ by incorporating $\vec{l}$, along with an additional H samples of the previous estimate for the missing portion of the signal, $\hat{x}^{(0)}$, into a first augmented left-sided sample vector $\vec{l}^{(1)}$;

(b) augmenting right-sided sample vector $\vec{r}$ by incorporating $\vec{r}$, along with an additional H samples of the previous estimate for the missing portion of the signal $\hat{x}^{(0)}$, into a first augmented right-sided sample vector $\vec{r}^{(1)}$;

(c) using the first augmented right-sided and left-sided sample vectors to calculate a first iterative estimate vector, $\hat{x}^{(1)}$, for the missing portion of the signal by performing steps 2) to 7) of claim 12.

14. The method of claim 13 wherein the first iterative estimate vector, $\hat{x}^{(1)}$, represents the final reconstructed version of the missing portion of the signal.

15. The method of claim 13 wherein the first iterative estimate vector, $\hat{x}^{(1)}$, represents an estimate to be further refined by subsequent iterations of the method of claim 12.

16. The method of claim 15 wherein, after a first iteration (k=1) is completed, the following steps are performed:

(a) augmenting the left-sided sample vector $\vec{l}$ by incorporating $\vec{l}$, along with 2H additional samples from $\hat{x}^{(1)}$, into a second augmented left-sided sample vector $\vec{l}^{(2)}$;

(b) augmenting the right-sided sample vector $\vec{r}$ by incorporating $\vec{r}$, along with 2H additional samples from $\hat{x}^{(1)}$, into a second augmented right-sided sample vector $\vec{r}^{(2)}$;

(c) repeating steps 2) to 7) of claim 12 to obtain a new signal estimate vector $\hat{x}^{(2)}$;

(d) after a $(k-1)^{th}$ iteration is performed, augmenting the left-sided sample vector $\vec{l}$ by incorporating $\vec{l}$, along with k.H additional samples from $\hat{x}^{(k-1)}$, into a $k^{th}$ augmented left-sided sample vector $\vec{l}^{(k)}$;

(e) after the $(k-1)^{th}$ iteration is performed, augmenting the right-sided sample vector $\vec{r}$ by incorporating $\vec{r}$, along with k.H additional samples, into a $k^{th}$ augmented right-sided sample vector $\vec{r}^{(k)}$;

(f) repeating steps 2) to 7) of claim 12 to obtain a new signal estimate vector $\hat{x}^{(k)}$; k representing the number of iterations required to reduce the mean-squared difference between two successive signal estimate vectors constructed from two consecutive iterations to less than a specified value.

17. The method of claim 16 wherein k is set to a specified value, such that the iterative process ceases after a specified maximum number of iterations, the signal estimate vector obtained from the last iteration setting forth reconstructed sample values for the missing portion of the signal.

18. The method of claim 16 wherein one iterative step is employed which completely augments the left-sided and right-sided sample vectors $\vec{l}$ and $\vec{r}$, such that the augmented vectors are equal, i.e., $\vec{l}^{(1)}=\vec{r}^{(1)}$, thereby providing first and second autoregressive parameter vectors that are equal, i.e., $\vec{\alpha}^{(1)}=\vec{b}^{(1)}$.

19. A signal reconstruction method as set forth in claim 3 wherein the first autoregressive model is represented by a left-sided autoregressive parameter vector $\vec{\alpha}$, the second autoregressive model is represented by a right-sided autoregressive parameter $\vec{b}$, the method further including the steps of:

placing the left-sided autoregressive parameter vector $\vec{\alpha}$ into matrix format to generate a matrix A representing a left-sided autoregressive parameter matrix, and placing the right-sided autoregressive parameter vector $\vec{b}$ into matrix format to generate a matrix B representing a right-sided autoregressive parameter matrix;

placing the first known set of samples into matrix format to generate a matrix L and placing the second known set of samples into matrix format to generate a matrix R, $\hat{\vec{x}}$ denoting an estimated signal vector specifying values for the set of missing samples;

calculating a first estimate for the set of missing samples by calculating a system matrix defined as $D=A^TA+B^TB$, the superscript T denoting a mathematical operation of transposition, calculating a vector $\vec{y}=-A^T L \vec{\alpha}-B^T R\vec{b}$, and calculating system matrix $D \cdot \hat{\vec{x}}=\vec{y}$.

20. The method of claim 19 wherein a second estimate for the set of missing samples is calculated using a least squares residual predictor method that uses a single autoregressive parameter vector according to the following system of equations:

$$D \cdot \hat{\vec{x}} = \vec{y}$$

where $$D = C^T C + C C^T$$

and $$\vec{y} = -C^T L \vec{c} - C R \vec{c};$$

the matrix C denoting the single autoregressive parameter matrix, the matrices L and R denoting left-sided and right-sided signal matrices, $\hat{\vec{x}}$ denoting the estimated signal vector for the set of missing samples, the vector $\vec{c}$ denoting the single autoregressive parameter vector, which is calculated over the first known portion of the signal preceding the set of missing samples, the previous estimate for the set of missing samples, and the second known portion of the signal succeeding the set of missing samples.

21. A signal reconstruction method as set forth in claim 20 wherein the second estimate based on a single autoregressive parameter vector is performed only if at least a minimum amount of stationarity exists between the first and second known portions of the signal, wherein stationarity is the existence of at least a minimum amount of similarity between the first and second autoregressive parameter vectors, the second estimate comprising a final estimate; otherwise, taking the first estimate as the final estimate.

22. A signal reconstruction method as set forth in claim 19 wherein the signal estimates are obtained by applying a least squares residual predictor at iteration k according to the following equation:

$$D^{(k)} \cdot \hat{\vec{x}}^{(k)} = \vec{y}^{(k)}$$

where $$D^{(k)} = A^{(k)T} A^{(k)} + B^{(k)T} B^{(k)}$$

and $$\vec{y}^{(k)} = -A^{(k)T} L \vec{\alpha}^{(k)} - B^{(k)T} R \vec{b}^{(k)};$$

the matrices $A^{(k)}$ and $B^{(k)}$ denoting left-sided and right-sided AR-parameter matrices, respectively, the matrices L and R denoting left-sided and right-sided signal matrices, respectively, the vectors $\vec{\alpha}^{(k)}$ and $\vec{b}^{(k)}$ denoting left-sided and right-sided autoregressive parameter vectors, respectively, and $\hat{\vec{x}}^{(k)}$ denoting an estimated signal vector for the set of missing samples.

23. A signal reconstruction system for restoring a missing portion of a digitized signal based upon a first known portion of the digitized signal and a second known portion of the digitized signal, the digitized signal including a plurality of samples, the system including:

(a) a missing sample detector for determining whether or not any samples are missing from the digitized signal;

b) a delay line for applying a predetermined amount of time delay to the digitized signal;

(c) an interpolator for estimating the missing portion of the signal from the first known portion and the second known portion of the digital signal;

(d) a switch, coupled to the missing sample detector, for directing the digitized signal to the delay line if no samples are missing from the digitized source signal; otherwise, directing the digitized signal to the interpolator;

the interpolator comprising:

(i) a segmentation device for determining the first known portion of the digital signal and the second known portion of the digital signal, and (ii) a segmentation parameter estimator, coupled to the segmentation device, for estimating parameters $N_L$, $N_R$, and M, wherein $N_L$ represents the number of samples in the first known portion, $N_R$ represents the number of samples in the second known portion, and M represents the number of samples in the missing segment; the segmentation parameter generating a left-sided sample vector in response to the first known portion and a right-sided sample vector in response to the second known portion;

(iii) a vector augmentation device, coupled to the segmentation parameter estimator, for generating K augmented left-sided sample vectors and K augmented right-sided sample vectors, wherein K is a positive integer;

(iv) an autoregressive parameter estimator coupled to the vector augmentation device for determining left-sided autoregressive parameters for the augmented left-sided sample vectors and right-sided autoregressive parameters for the augmented right-sided sample vectors, the left-sided autoregressive parameters denoted by a vector $\vec{\alpha}^{(k)}$, and the right-sided autoregressive parameters denoted by a vector $\vec{b}^{(k)}$, (v) a matrix inverter, coupled to the autoregressive parameter estimator and to the segmentation device, for determining an estimated signal for the missing segment, denoted as vector $\hat{\vec{x}}^{(k)}$, in response to vector $\vec{\alpha}^{(k)}$ vector $\vec{b}^{(k)}$, and the segmentation device.

\* \* \* \* \*